(12) United States Patent
Ninose et al.

(10) Patent No.: US 7,590,809 B2
(45) Date of Patent: Sep. 15, 2009

(54) REMOTE COPY SYSTEM

(75) Inventors: Kenta Ninose, Yokohama (JP); Hiroshi Arakawa, Sagamihara (JP); Takashige Iwamura, Yokohama (JP); Yoshihiro Asaka, Odawara (JP); Yusuke Hirakawa, Odawara (JP)

(73) Assignee: Hitachi, Ltd., Tokyo (JP)

( * ) Notice: Subject to any disclaimer, the term of this patent is extended or adjusted under 35 U.S.C. 154(b) by 579 days.

(21) Appl. No.: 11/015,194

(22) Filed: Dec. 17, 2004

(65) Prior Publication Data
US 2006/0085609 A1 Apr. 20, 2006

(30) Foreign Application Priority Data
Oct. 19, 2004 (JP) .............................. 2004-304648

(51) Int. Cl.
*G06F 12/00* (2006.01)
(52) U.S. Cl. ..................................... 711/162
(58) Field of Classification Search .................. 711/162
See application file for complete search history.

(56) References Cited

U.S. PATENT DOCUMENTS

| 7,194,590 B2* | 3/2007 | Achiwa et al. ............... 711/162 |
| 2003/0051111 A1* | 3/2003 | Nakano et al. ............... 711/162 |
| 2005/0050288 A1 | 3/2005 | Takahashi et al. |
| 2005/0055523 A1 | 3/2005 | Suishu et al. |

FOREIGN PATENT DOCUMENTS

JP          2003-122509          4/2003

* cited by examiner

*Primary Examiner*—Hyung S Sough
*Assistant Examiner*—Aracelis Ruiz
(74) *Attorney, Agent, or Firm*—Townsend and Townsend and Crew LLP

(57) ABSTRACT

To provide a computer system constituting a multitarget array and utilizing a remote copy technique for backing up data, in which when a failure occurs in a primary site, a new pair is formed between remaining two secondary sites without copying all data. A first secondary site is associated with the primary site by synchronous remote copy. A second secondary site is associated with the primary site by asynchronous remote copy. A storage system of the first secondary site includes a difference bitmap indicating an area to which data has been written from a host computer. When a failure occurs in a host computer of the primary site, only data of an area indicated by the difference bitmap is transferred to a storage system of the second secondary site.

8 Claims, 32 Drawing Sheets

FIG. 3

UPDATE INFORMATION 300

| SETTING ITEM | SETTING VALUE |
|---|---|
| TIME AT WHICH WRITE INSTRUCTION IS RECEIVED | 1999/3/17 22:20:10 |
| GROUP NUMBER | 1 |
| UPDATE NUMBER | 4 |
| LOGICAL ADDRESS OF WRITE INSTRUCTION | LOGICAL VOLUME NUMBER:1 LOCATION FROM HEAD OF STORAGE AREA OF LOGICAL VOLUME:700 |
| DATA SIZE OF WRITE DATA | 300 |
| LOGICAL ADDRESS OF JOURNAL LOGICAL VOLUME STORING WRITE DATA | LOGICAL VOLUME NUMBER:4 LOCATION FROM HEAD OF STORAGE AREA OF LOGICAL VOLUME:1500 |

VOLUME INFORMATION 400 OF STORAGE SYSTEM A

| LOGICAL VOLUME NUMBER | VOLUME STATE | FORMAT TYPE | CAPACITY | SYNCHRONOUS PAIR NUMBER | ASYNCHRONOUS PAIR NUMBER | PHYSICAL ADDRESS ||
|---|---|---|---|---|---|---|---|
| | | | | | | DISK DRIVE NUMBER | LOCATION FROM HEAD |
| 1 | PRIMARY | OPEN3 | 3 | 1 | 3 | 1 | 0 |
| 2 | PRIMARY | OPEN6 | 6 | 2 | 4 | 1 | 3 |
| 3 | UNUSED | OPEN6 | 6 | – | – | 1 | 9 |
| 4 | NORMAL | OPEN9 | 9 | – | – | 2 | 0 |
| 5 | NORMAL | OPEN3 | 3 | – | – | 2 | 9 |
| 6 | UNUSED | OPEN6 | 6 | – | – | 2 | 12 |

FIG. 5

VOLUME INFORMATION 400 OF STORAGE SYSTEM B

| 401 | 402 | 403 | 404 | 405 | 406 | 407 PHYSICAL ADDRESS | |
|---|---|---|---|---|---|---|---|
| | | | | | | 407a | 407b |
| LOGICAL VOLUME NUMBER | VOLUME STATE | FORMAT TYPE | CAPACITY | SYNCHRONOUS PAIR NUMBER | ASYNCHRONOUS PAIR NUMBER | DISK DRIVE NUMBER | LOCATION FROM HEAD |
| 1 | SECONDARY | OPEN3 | 3 | 1 | 0 | 1 | 0 |
| 2 | SECONDARY | OPEN6 | 6 | 2 | 0 | 2 | 0 |
| 3 | NORMAL | OPEN9 | 9 | — | — | 3 | 0 |

FIG. 6

VOLUME INFORMATION 400 OF STORAGE SYSTEM C

| LOGICAL VOLUME NUMBER | VOLUME STATE | FORMAT TYPE | CAPACITY | SYNCHRONOUS PAIR NUMBER | ASYNCHRONOUS PAIR NUMBER | PHYSICAL ADDRESS ||
|---|---|---|---|---|---|---|---|
| | | | | | | DISK DRIVE NUMBER | LOCATION FROM HEAD |
| 1 | SECONDARY | OPEN3 | 3 | 0 | 1 | 1 | 0 |
| 2 | SECONDARY | OPEN6 | 6 | 0 | 2 | 2 | 0 |
| 3 | NORMAL | OPEN9 | 9 | — | — | 3 | 0 |

FIG. 7

PAIR INFORMATION 500 OF STORAGE SYSTEM A

| PAIR NUMBER 501 | PAIR STATE 502 | PRIMARY STORAGE SYSTEM NUMBER 503 | PRIMARY LOGICAL VOLUME NUMBER 504 | SECONDARY STORAGE SYSTEM NUMBER 505 | SECONDARY LOGICAL VOLUME NUMBER 506 | GROUP NUMBER 507 | COPIED ADDRESS 508 | DIFFERENCE BM LOCATION 509 |
|---|---|---|---|---|---|---|---|---|
| 1 | NORMAL | A | 1 | B | 1 | 1 | 0 | aaa |
| 2 | NORMAL | A | 2 | B | 2 | 1 | 0 | bbb |
| 3 | NORMAL | A | 1 | C | 1 | 2 | 0 | ccc |
| 4 | NORMAL | A | 2 | C | 2 | 2 | 0 | ddd |
| 5 | UNUSED | 0 | 0 | 0 | 0 | 0 | 0 | 0 |

FIG. 8

PAIR INFORMATION 500 OF STORAGE SYSTEM B

| PAIR NUMBER | PAIR STATE | PRIMARY STORAGE SYSTEM NUMBER | PRIMARY LOGICAL VOLUME NUMBER | SECONDARY STORAGE SYSTEM NUMBER | SECONDARY LOGICAL VOLUME NUMBER | GROUP NUMBER | COPIED ADDRESS | DIFFERENCE BM LOCATION |
|---|---|---|---|---|---|---|---|---|
| 1 | NORMAL | A | 1 | B | 1 | 1 | 0 | eee |
| 2 | NORMAL | A | 2 | B | 2 | 1 | 0 | fff |
| 3 | UNUSED | 0 | 0 | 0 | 0 | 0 | 0 | 0 |

PAIR INFORMATION 500 OF STORAGE SYSTEM C

| 501 | 502 | 503 | 504 | 505 | 506 | 507 | 508 | 509 |
|---|---|---|---|---|---|---|---|---|
| PAIR NUMBER | PAIR STATE | PRIMARY STORAGE SYSTEM NUMBER | PRIMARY LOGICAL VOLUME NUMBER | SECONDARY STORAGE SYSTEM NUMBER | SECONDARY LOGICAL VOLUME NUMBER | GROUP NUMBER | COPIED ADDRESS | DIFFERENCE BM LOCATION |
| 1 | NORMAL | A | 1 | C | 1 | 1 | 0 | ggg |
| 2 | NORMAL | A | 2 | C | 2 | 1 | 0 | hhh |
| 3 | UNUSED | 0 | 0 | 0 | 0 | 0 | 0 | 0 |

FIG. 10

GROUP INFORMATION 600 OF STORAGE SYSTEM A

| GROUP NUMBER 601 | GROUP STATE 602 | PAIR SET 603 | JOURNAL LOGICAL VOLUME NUMBER 604 | UPDATE NUMBER 605 | COPY TYPE 606 | COUNTERPART STORAGE SYSTEM NUMBER 607 | COUNTERPART GROUP NUMBER 608 |
|---|---|---|---|---|---|---|---|
| 1 | NORMAL | 1, 2 | 4 | 6 | SYNCHRONOUS | B | 1 |
| 2 | NORMAL | 3, 4 | 4 | 6 | ASYNCHRONOUS | C | 1 |

FIG. 11

GROUP INFORMATION 600 OF STORAGE SYSTEM B

| 601 | 602 | 603 | 604 | 605 | 606 | 607 | 608 |
|---|---|---|---|---|---|---|---|
| GROUP NUMBER | GROUP STATE | PAIR SET | JOURNAL LOGICAL VOLUME NUMBER | UPDATE NUMBER | COPY TYPE | COUNTERPART STORAGE SYSTEM NUMBER | COUNTERPART GROUP NUMBER |
| 1 | NORMAL | 1, 2 | 3 | 6 | SYNCHRONOUS | A | 1 |

FIG. 12

GROUP INFORMATION 600 OF STORAGE SYSTEM C

| 601 | 602 | 603 | 604 | 605 | 606 | 607 | 608 |
|---|---|---|---|---|---|---|---|
| GROUP NUMBER | GROUP STATE | PAIR SET | JOURNAL LOGICAL VOLUME NUMBER | UPDATE NUMBER | COPY TYPE | COUNTERPART STORAGE SYSTEM NUMBER | COUNTERPART GROUP NUMBER |
| 1 | NORMAL | 1, 2 | 3 | 5 | ASYNCHRONOUS | A | 2 |

FIG. 13

POINTER INFORMATION 700 OF STORAGE SYSTEM A

| | LOGICAL ADDRESS | |
|---|---|---|
| | LOGICAL VOLUME NUMBER | LOCATION FROM HEAD OF STORAGE AREA OF LOGICAL VOLUME |
| UPDATE INFORMATION AREA HEAD ADDRESS | 4 | 0 |
| WRITE DATA AREA HEAD ADDRESS | 4 | 700 |
| LATEST UPDATE INFORMATION ADDRESS | 4 | 250 |
| EARLIEST UPDATE INFORMATION ADDRESS | 4 | 50 |
| LATEST WRITE DATA ADDRESS | 4 | 2200 |
| EARLIEST WRITE DATA ADDRESS | 4 | 1300 |
| READ START ADDRESS | 4 | 200 |
| RETRY START ADDRESS | 4 | 150 |

POINTER INFORMATION 700 OF STORAGE SYSTEM B

| | LOGICAL ADDRESS | |
|---|---|---|
| | LOGICAL VOLUME NUMBER | LOCATION FROM HEAD OF STORAGE AREA OF LOGICAL VOLUME |
| UPDATE INFORMATION AREA HEAD ADDRESS | 3 | 0 |
| WRITE DATA AREA HEAD ADDRESS | 3 | 700 |
| LATEST UPDATE INFORMATION ADDRESS | 3 | 250 |
| EARLIEST UPDATE INFORMATION ADDRESS | 3 | 150 |
| LATEST WRITE DATA ADDRESS | 3 | 2200 |
| EARLIEST WRITE DATA ADDRESS | 3 | 1800 |
| READ START ADDRESS | 3 | 200 |
| RETRY START ADDRESS | 3 | 150 |

POINTER INFORMATION 700 OF STORAGE SYSTEM C

| | LOGICAL ADDRESS | |
|---|---|---|
| | LOGICAL VOLUME NUMBER | LOCATION FROM HEAD OF STORAGE AREA OF LOGICAL VOLUME |
| UPDATE INFORMATION AREA HEAD ADDRESS | 3 | 0 |
| WRITE DATA AREA HEAD ADDRESS | 3 | 700 |
| LATEST UPDATE INFORMATION ADDRESS | 3 | 200 |
| EARLIEST UPDATE INFORMATION ADDRESS | 3 | 50 |
| LATEST WRITE DATA ADDRESS | 3 | 2200 |
| EARLIEST WRITE DATA ADDRESS | 3 | 1300 |
| READ START ADDRESS | 3 | 0 |
| RETRY START ADDRESS | 3 | 0 |

UPDATE INFORMATION 300

| SETTING ITEM | SETTING VALUE |
|---|---|
| TIME AT WHICH WRITE INSTRUCTION IS RECEIVED | 1999/3/17 22:20:10 |
| GROUP NUMBER | 1 |
| UPDATE NUMBER | 5 |
| LOGICAL ADDRESS OF WRITE INSTRUCTION | LOGICAL VOLUME NUMBER:1 LOCATION FROM HEAD OF STORAGE AREA OF LOGICAL VOLUME:800 |
| DATA SIZE OF WRITE DATA | 100 |
| LOGICAL ADDRESS OF JOURNAL LOGICAL VOLUME STORING WRITE DATA | LOGICAL VOLUME NUMBER:4 LOCATION FROM HEAD OF STORAGE AREA OF LOGICAL VOLUME:2200 |

*FIG. 20*

REMOTE COPY SYSTEM

CLAIM OF PRIORITY

The present application claims priority from Japanese application P2004-304648 filed on Oct. 19, 2004, the content of which is hereby incorporated by reference into this application.

BACKGROUND

This invention relates to a disaster recovery for a computer system performed by utilizing remote copy.

The data storage market has seen an increasing demand for a so-called disaster recovery system for preventing loss of data even when a storage system storing mass data is destroyed in a disaster or the like. In order to satisfy such a demand, there is provided a computer system that utilizes a remote copy technique for backing up data. This computer system allows the same data to be stored in storage systems located in two different sites that are sufficiently distant from each other. When data is updated in one storage system, the update is reflected on the other storage system. Thus, the two storage systems maintain data consistency.

In addition, JP 2003-122509 A discloses a computer system in which storage systems are located in three different sites that are sufficiently distant from one other in order to enhance the safety of data stored therein. In this computer system, synchronous remote copy is used to maintain the data consistency between a first storage system used for normal tasks and a second storage system located in the distance. Meanwhile, asynchronous remote copy is used to maintain the data consistency between the first storage system and a third storage system located in the distance.

When the first storage system can no longer be used for tasks because of a failure due to a disaster, the second storage system takes over the tasks of the first storage system. When even the second storage system cannot be used, the third storage system takes over the tasks of the first storage system. As a result, the loss of data can be prevented even when serious disaster occurs.

During normal operation of the computer system including the storage systems located in the three different sites, the data cannot be copied between the second storage system and the third storage system. Thus, data consistency cannot be guaranteed between the second storage system and the third storage system. Therefore, when a failure occurs in the second storage system even after the second storage system takes over the tasks of the first storage system, the third storage system cannot take over the tasks of the second storage system.

In view of this, the data consistency is maintained between the second storage system and the third storage system before the second storage system that has taken over the tasks of the first storage system begins operation. After the second storage system begins operation, the remote copy is used to reflect the update of data of the second storage system on the third storage system. As a result, when a failure occurs in the second storage system, the third storage system can take over the tasks of the second storage system.

SUMMARY

As described above, when the second storage system takes over the tasks of the first storage system, all the data stored in the second storage system are copied to the third storage system, thereby maintaining the data consistency among the three storage systems. However, it takes a long time to copy all the data as described above. In particular, in a storage system whose capacity is increasing in recent years, the above-mentioned copy may take several hours or more. If the second storage system cannot be used for tasks until all the data have been copied, a significant period of system downtime may cause serious economic loss.

Therefore, there is need to improve the above-mentioned problem, and to provide a computer system that constitutes a multitarget array structure and utilizes a remote copy technique for backing up data.

According to an embodiment of this invention, there is provided a computer system, including: a first storage system that is coupled to a first host computer; a second storage system that is coupled to a second host computer and the first storage system, and a third storage system that is coupled to the first storage system and the second storage system, wherein: the first storage system stores data sent from the first host computer, transfers the data sent from the first host computer to the second storage system by synchronous remote copy, and transfers the data sent from the first host computer to the third storage system by asynchronous remote copy; and the second storage system comprises a first difference bitmap, updates a bit of the first difference bitmap corresponding to an area to which the data has been written from the second host computer after data is written from the second host computer to the second storage system, and transfers the data stored in the area corresponding to the updated bit of the first difference bitmap to the third storage system.

According to another embodiment of this invention, there is provided a computer system, including: a first storage system that is coupled to a first host computer; a second storage system that is coupled to a second host computer and the first storage system; and a third storage system that is coupled to the first storage system and the second storage system, wherein: after receiving an instruction to write data from the first host computer, the first storage system stores an update order identifier for identifying the order of writing the data and the data as a first journal record, transfers the update order identifier and the data to the second storage system by the synchronous remote copy, and transfers the first journal record to the third storage system by the asynchronous remote copy; the second storage system stores the update order identifier and the data that have been transferred from the first storage system as a second journal record, stops transferring data between the first storage system and the second storage system by the synchronous remote copy, stores, after data is written from the second host computer, the written data and an update order identifier that follows the update order identifier that has been transferred from the first storage system as the second journal record, and transfers the second journal record to the third storage system; and the third storage system receives the first journal record that has been transferred from the first storage system, further receives the second journal record that has been transferred from the second storage system, and further stores the data of the first journal record and the data of the second journal record that have been received, in an order of the update order identifiers.

According to these embodiments, among data stored in the second storage system, only data that is not stored in the third storage system (in other words, difference data) is transferred and copied to the third storage system. Further, after the second storage system takes over the task of the first storage system, information on data that is updated in the second storage system is recorded in the second storage system. Thus, when a failure occurs in the first storage system, the second storage system can immediately take over the task. As a result, according to this invention, the loss of data due to a disaster or the like can be prevented while suppressing the economic loss due to a system stop over a long term.

BRIEF DESCRIPTION OF THE DRAWINGS

FIG. 3 is an explanatory diagram of an example of update information of a journal according to the first embodiment of this invention.

FIG. 5 is an explanatory diagram of volume information held by the storage system according to the first embodiment of this invention.

FIG. 6 is an explanatory diagram of volume information held by another storage system according to the first embodiment of this invention.

FIG. 7 is an explanatory diagram of volume information held by further another storage system according to the first embodiment of this invention.

FIG. 8 is an explanatory diagram of pair information held by the storage system according to the first embodiment of this invention.

FIG. 9 is an explanatory diagram of pair information held by the another storage system according to the first embodiment of this invention.

FIG. 10 is an explanatory diagram of pair information held by the further another storage system according to the first embodiment of this invention.

FIG. 11 is an explanatory diagram of group information held by the storage system according to the first embodiment of this invention.

FIG. 12 is an explanatory diagram of group information held by the another storage system according to the first embodiment of this invention.

FIG. 13 is an explanatory diagram of group information held by the further another storage system according to the first embodiment of this invention.

FIG. 14 is an explanatory diagram of pointer information held by the storage system according to the first embodiment of this invention.

FIG. 16 is an explanatory diagram of pointer information held by the another storage system according to the first embodiment of this invention.

FIG. 17 is an explanatory diagram of pointer information held by the further another storage system according to the first embodiment of this invention.

FIG. 20 is an explanatory diagram of another example of the update information of the journal according to the first embodiment of this invention.

DETAILED DESCRIPTION OF THE PREFERRED EMBODIMENTS

<System Structure>

Figure 1:
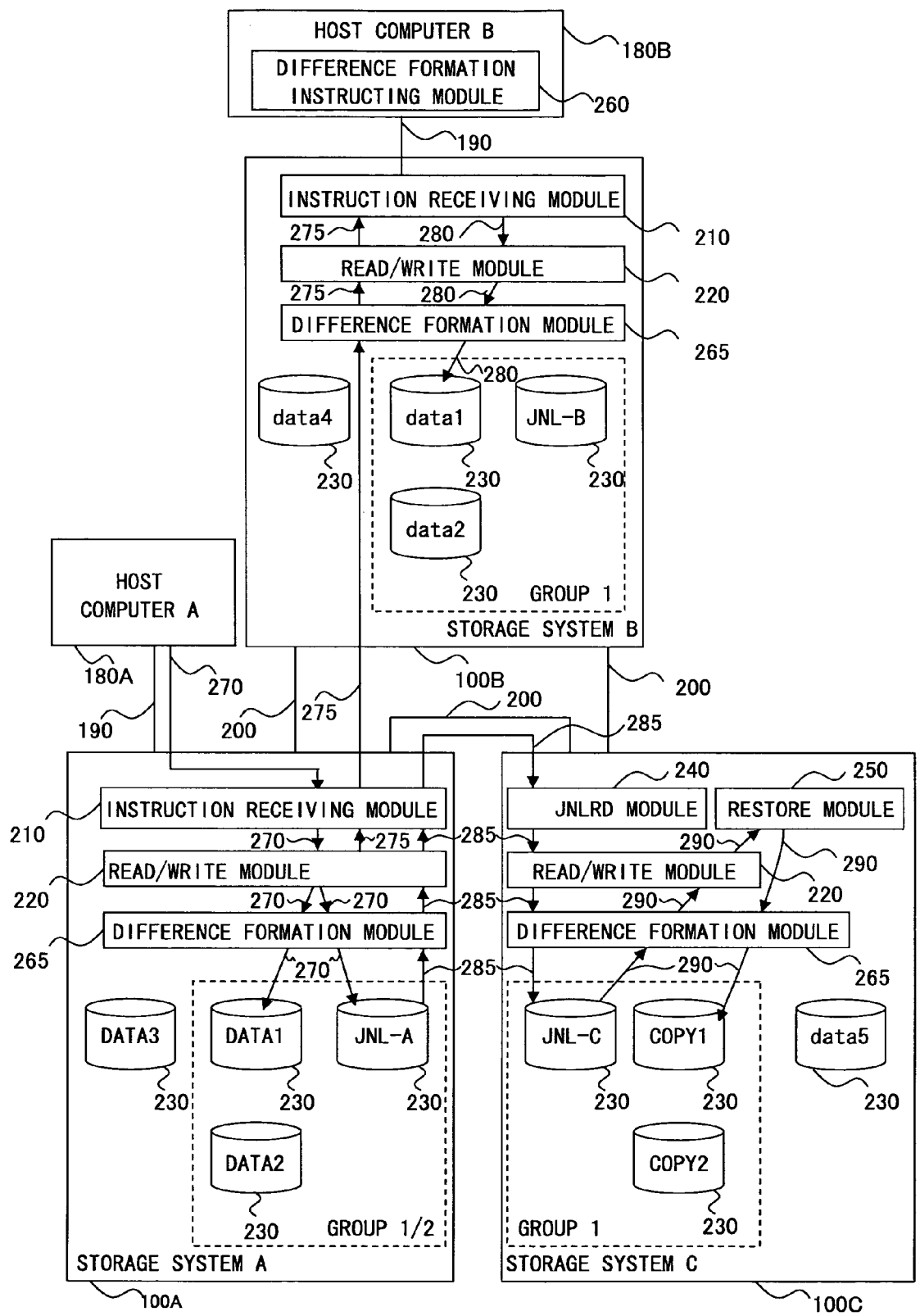
FIG. 1 is a functional block diagram of a computer system according to a first embodiment of this invention.

FIG. 1 is a functional block diagram of a computer system according to a first embodiment of this invention.

The computer system according to this embodiment includes a plurality of storage systems 100 and a plurality of host computers 180. FIG. 1 shows three storage systems 100 (100A to 100C) included in the computer system according to this embodiment. Hereinafter, the storage system 100A is referred to merely as a "storage system A". The storage system 100B and the storage system 100C are similarly described as a "storage system B" and a "storage system C", respectively. Those storage systems 100 are communicably connected with one another through connection paths 200.

As described later in detail with reference to FIG. 2, the storage systems 100 each include a control unit (disk drive controller) and a storage area provided in a disk drive. The storage systems 100 are each connected to one of the host computers 180 through a connection path 190, and stores data in the storage area. The storage system A, the storage system B, and the storage system C are connected to a host computer 180A (host computer A), a host computer 180B (host computer B), and another host computer (not shown), respectively.

Those storage systems 100 are located geographically apart from one another for the purpose of backup serving in a case where a disaster or the like causes a failure. For example, the storage system B is located comparatively less far away, specifically, around 100 km away, from the storage system A, and the storage system C is located comparatively farther away, specifically, more than several hundred km away, from the storage system A.

According to this embodiment, the storage system A is used during normal operation (in other words, while the system is operating normally without failures occurring). During the normal operation, the host computer B does not use the storage system B. When a failure occurs in the storage system A or the host computer A, the storage system B is used in place of the storage system A. Also, when a failure occurs in the storage system B or the host computer B, the storage system C is used in place of the storage system B. Such operation of a redundant component (for example, the storage system B or the storage system C) carried out in place of a component in which a failure has occurred (for example, the storage system A) is called a failover.

As described later, during normal operation, a copy of the data of the storage system A is stored in the storage system B by synchronous remote copy. Also, the copy of the data of the storage system A is stored in the storage system C by asynchronous remote copy. Hereinafter, the storage system serving as a copy source and the storage system serving as a copy destination are described as a primary storage system and a secondary storage system, respectively. In other words, during normal operation, the storage system A is the primary storage system, and the storage systems B and C are the secondary storage systems. Two storage systems 100 or two logical volumes (described later) associated with each other by remote copy are described as a pair. In other words, during normal operation, the storage system A and the storage system B form a pair, and the storage system A and the storage system C also form a pair.

According to the synchronous remote copy, the data of the primary storage system A is synchronously copied to the secondary storage system B. In other words, upon receiving a write instruction for data from the host computer A, the primary storage system A stores the data involved in the write instruction. In addition, when the data is a subject of the remote copy, the primary storage system A transfers the data to the secondary storage system B through the connection path 200. The secondary storage system B stores the transferred data. After that, the secondary storage system B notifies the primary storage system A that the data has been stored. Upon receiving a notification that the data has been stored, the primary storage system A notifies the host computer A that the data has been written. As a result, when the host computer A receives the notification that the data has been written, the data of the primary storage system A necessarily coincides with the data of the secondary storage system B.

On the other hand, according to the asynchronous remote copy, the data of the primary storage system A is asynchronously copied to the secondary storage system C. In other words, upon receiving a write instruction for data from the host computer A, the primary storage system A stores the data involved in the write instruction. Having stored the data, the primary storage system A notifies the host computer A that the data has been written. In addition, when the data is a subject of the remote copy, the primary storage system A transfers the data to the secondary storage system C through the connection path 200. The secondary storage system C stores the transferred data. After that, the secondary storage system C notifies the primary storage system A that the data has been stored. The transfer may be executed immediately after the data of the primary storage system A is stored, but may be executed after the elapse of an arbitrary period of time. For example, when communication traffic in the connection path 200 is heavy, the data may be transferred after the heavy traffic is resolved. Regardless of whether or not a notification that the data has been stored has been received from the secondary storage system C, the primary storage system A notifies the host computer A that the data has been written. As a result, even when the host computer A receives the notification that the data has been written, the data of the primary storage system A does not necessarily coincide with the data of the secondary storage system C.

In this embodiment, the asynchronous remote copy is executed by transfer of a journal (described later).

In this embodiment, update of data held in the storage system 100 is executed by the host computer 180 based on the write instruction issued by the host computer 180. The transfer of the data from the primary storage system A to the secondary storage system B and the update of the data are executed in response to the remote write instruction. In addition, the transfer of the data from the primary storage system A to the secondary storage system C and the update of the data are executed by a journal read processing.

The host computers 180 each include at least a CPU (not shown) and a memory (not shown). The CPU executes various programs (application programs) stored in the memory to realize various functions. The host computer 180 is, for example, a PC, a workstation, or a main frame computer.

The host computer A uses the primary storage system A to execute a processing (task) to be provided to a user such as an enterprise user or a personal user. The host computer A is also used as a computer for maintaining/managing the primary storage system A.

The connection path 190 is a communication path, which is able to be a multipurpose network like LAN (Local Area Network) or a network specialized for a storage like FC (Fibre Channel) network including SAN (Storage Area Network) etc. The host computer A and the primary storage system A communicate with each other through the connection path 190 via a predetermined communication protocol. The host computer A is connected to a control unit of the primary storage system A through the connection path 190, and issues an access instruction to the logical volume (described later).

The host computer B has the same structure as the host computer A, and is connected to the secondary storage system B. During normal operation (in other words, while the host computer A and the primary storage system A are operating normally), the host computer B does not execute a processing to be provided to a user such as an enterprise user or a personal user. However, in a case where a failure occurs in the host computer A or the primary storage system A, the host computer B uses the secondary storage system B to execute the processing to be provided to the user such as an enterprise user or a personal user in place of the host computer A.

It should be noted that the case where a failure occurs in the host computer A or the primary storage system A means a case where the host computer A or the primary storage system A is not operating normally, and includes a intentional halt for maintenance in addition to the case where a disaster or the like causes a failure.

The host computer B further includes a difference formation instructing module 260. The difference formation instructing module 260 is stored in the memory (not shown) of the host computer B, and is implemented by a program executed by the CPU (not shown). When the host computer B is used in place of the host computer A, the difference formation instructing module 260 forms a pair with the storage system B set as a primary storage system and the storage system C set as a secondary storage system. At this time, with a predetermined condition being satisfied, the difference formation instructing module 260 forms the pair by copying only difference data without copying all the data stored in the storage system B to the storage system C. This invention relates to management of the difference data and pair formation using the difference data. Detailed description will be made later of a processing executed by the difference formation instructing module 260.

The connection path 200 is a communication path, which is able to be a multipurpose network like LAN (Local Area Network) or a network specialized for a storage like FC (Fibre Channel) network including SAN (Storage Area Network)

etc. The storage systems 100 communicate with one another through the connection paths 200 via a predetermined communication protocol. The storage systems 100 cause their control units to communicate with one another via the connection paths 200, whereby data is remotely copied from one to another.

In this embodiment, when updating data that is a subject of the remote copy, the storage system 100 creates a journal about the update, which is stored in the storage area, and copies data based on the journal. The storage systems 100 each hold a journal. As described later, in the pair used for the asynchronous remote copy, the journal is transferred from the primary storage system 100 to the secondary storage system 100, and the data of the journal is reflected on the secondary storage system 100. As a result, the update of the data of the primary storage system 100 is reflected on the data of the secondary storage system 100.

As shown in FIG. 1, the primary storage system A and the secondary storage system B each include an instruction receiving module 210, a read/write module 220, and a difference formation module 265. The secondary storage system 100C includes a journal read (JNLRD) module 240, the read/write module 220, a restore module 250, and the difference formation module 265. Each of those modules is stored in the memory (not shown) provided to the control unit of the storage system 100, and is implemented by a program executed by the CPU (not shown).

The storage area of each of the storage systems 100 is divided into logical volumes 230 for management. Each of the logical volumes 230 is a logical area recognized as a single disk drive by the host computer 180. One logical volume 230 may be an area within one disk drive. Alternatively, one logical volume 230 may be associated with the areas of a plurality of disk drives by conversion between a logical address and a physical addresses.

In this embodiment, the logical volumes 230 of the primary storage system A are named, for example, "DATA1", "DATA2", "DATA3", and "JNL-A". The logical volumes 230 of the secondary storage system B are similarly named, for example, "data1", "data2", "data4", and "JNL-B". The logical volumes 230 of the secondary storage system C are named as, for example, "COPY1", "COPY2", "data5", and "JNL-C".

When the host computer A issues an instruction to update data to the primary storage system A, the primary storage system A updates the data, and creates a journal to store the journal in the JNL-A (270). Then, the primary storage system A synchronously, remotely copies the data to the secondary storage system B (275). The secondary storage system B updates its data into the received data (280).

Further, the journal is transferred from the primary storage system A to the secondary storage system C, thereby asynchronously, remotely copying the data of the journal (285). The transfer is realized by the journal read processing executed by the JNLRD module 240 of the secondary storage system C. Alternatively, the primary storage system A may instruct the transfer of the journal.

The secondary storage system C reflects the update of the data based on the data of the journal (290). The processing of reflecting the update of the data based on the data of the journal is referred to as a restore processing. The restore processing will be described later in detail.

The data to be processed is stored in any one of the logical volumes 230. The capacity and physical storage location (physical address) of the logical volume 230 in each of the storage systems 100 can be set by using a maintenance computer (not shown) or the host computer 180 connected to the storage system 100. The physical address of each of the logical volumes 230 is stored in volume information 400 described later. The physical address is composed of, for example, a number identifying each of one or more disk drives within one of the storage systems 100 (disk drive number) and a value uniquely representing a storage area within the disk drive, for example, a value representing a location from the head of a storage area within the disk drive. In the following description, the physical address is a set of the disk drive and the location from the head of a storage area within the disk drive.

The data stored in the storage system 100 is uniquely identified by a number identifying the logical volume 230 (logical volume number) and a value uniquely representing a data storing area, for example, a value representing a location (intra-logical-address location) from the head of a data storing area within the logical volume. In the following description, the logical address is a set of the logical volume number and the intra-logical-address location. The host computer 180 designates the logical address to reference or update the data stored in the storage system 100.

Hereinafter, the logical volume 230 to be a copy source during the remote copy is set to be a primary logical volume, and the logical volume 230 to be a copy destination is set to be a secondary logical volume. The pair is defined by a set of the primary logical volume and the secondary logical volume. The relationship between the primary logical volume and the secondary logical volume to be the pair, the states thereof, and the like are stored in pair information 500 described later.

Further, when the asynchronous remote copy is used to reflect the update of the data of the primary logical volume on the secondary logical volume, a management unit called "group" is provided in order to update the data of the secondary logical volume according to a data update order in which data are updated in the primary logical volumes.

For example, the host computer 180 may update a first data of a first primary logical volume, and then read out the first data, a numerical value of which is used to update a second data of a second primary logical volume. After that, when the asynchronous remote copy is executed from the primary logical volumes to the secondary logical volumes with the remote copy of the first primary logical volume and the remote copy of the second primary logical volume being independently performed, the data of the second data may be copied before the first data is copied. In this case, when the remote copy stops due to a system failure or the like after the second data is copied and before the first data is copied, the data consistency between a first secondary logical volume and a second secondary logical volume is lost.

Even when the asynchronous remote copy stops midway in the above-mentioned state, in order to maintain the data consistency between the first secondary logical volume and the second secondary logical volume, the logical volumes 230 in which the data update order needs to be maintained are registered as the same group. An update number in group information 600 described later is assigned to each update of the data, and the data are copied to the secondary logical volumes in the update number order. An update time may be used in place of the update number.

In FIG. 1, for example, when data is asynchronously, remotely copied from the logical volume DATA1 and logical volume DATA2 of the primary storage system A to the logical volume COPY1 and logical volume COPY2 of the secondary storage system C, the data update order needs to be maintained. Therefore, as shown in FIG. 11, the primary storage system A is provided with a group 2 (hereinafter, the group having a group number of n will be referred to as "group n")

composed of the logical volume DATA1, the logical volume DATA2, and the journal logical volume JNL-A that corresponds to those volumes. Meanwhile, as shown in FIG. 13, the secondary storage system C is provided with a group 1 composed of the logical volume COPY1 serving as the copy of the logical volume DATA1, the logical volume COPY2 serving as the copy of the logical volume DATA2, and the journal logical volume JNL-C that corresponds to those volumes.

On the other hand, it is originally unnecessary to provide a group between the primary storage system A and the secondary storage system B. This is because the consistency of the data is not lost even when the synchronous remote copy is interrupted. However, as described later in detail with reference to FIGS. 29 to 32, according to this invention, the primary storage system B also includes a journal logical volume 230 so that the secondary storage systems B and C form a pair when a failure occurs in the primary storage system A. In order to maintain the consistency between the journal logical volume 230 of the secondary storage system B and the journal logical volume 230 of the secondary storage system C, a group is also provided between the primary storage system A and the secondary storage system B.

In other words, as shown in FIG. 11, the primary storage system A is provided with a group 1 composed of the logical volume DATA1, the logical volume DATA2, and the journal logical volume JNL-A that corresponds to those volumes. Meanwhile, as shown in FIG. 12, the secondary storage system B is provided with a group 1 composed of the logical volume data1 serving as the copy of the logical volume DATA1, the logical volume data2 serving as the copy of the logical volume DATA2, and the journal logical volume JNL-B that corresponds to those volumes.

For updating the data of the primary logical volumes DATA1 and DATA2, the primary storage system A creates a journal described later and stores the journal in the logical volume 230 within the primary storage system A. In this embodiment, each group is provided with the logical volume (hereinafter, referred to as "journal logical volume") that stores only a journal. In FIG. 1, the journal logical volume of the group 1 is the JNL-A.

The group 1 of the secondary storage system C is also provided with the journal logical volume JNL-C. The journal logical volume JNL-C is used to store the journal transferred from the primary storage system A to the secondary storage system C. By storing the transferred journal in the journal logical volume JNL-C, it is also possible, for example, that the data of the secondary logical volumes COPY1 and COPY2 are not updated in the case where a load on the secondary storage system C is heavy upon reception of the journal from the primary storage system A, and after the load on the secondary storage system C becomes light, the data are updated. Alternatively, when there are a plurality of connection paths 200, journals are transferred from the primary storage system A to the secondary storage system C through those paths in a multiplex manner, so the transfer performance of the connection paths 200 can be efficiently used.

In that case, the journal having a larger update number may reach the secondary storage system C before the journal having a small update number. In this case, the journal having a larger update number is stored in the journal logical volume JNL-C until the journal having a small update number reaches there. After that, in the update number order, the contents of the journals are reflected on the secondary logical volumes COPY1 and COPY2. In other words, the data of the journals are written in the secondary logical volumes COPY1 and COPY2 in the update number order. Accordingly, the data of the secondary logical volumes COPY1 and COPY2 are updated in the same manner as the data of the primary logical volumes DATA1 and DATA2.

Meanwhile, the secondary storage system B is also provided with the journal logical volume JNL-B. The synchronous remote copy is executed between the primary storage system A and the secondary storage system B. Even when stopping before completion, the synchronous remote copy causes no problem of losing the data consistency as described above. In this respect, the secondary storage system B need not be provided with the journal logical volume JNL-B. However, in this invention, when a failure occurs in the host computer A or the primary storage system A, a pair is formed between the secondary storage system B and the secondary storage system C. At this time, in order to form the pair by copying only the difference data, the journal logical volume JNL-B is used. Detailed description will be made later of how the journal logical volume JNL-B is used for forming the pair.

<Structure of Storage System>

Figure 2:
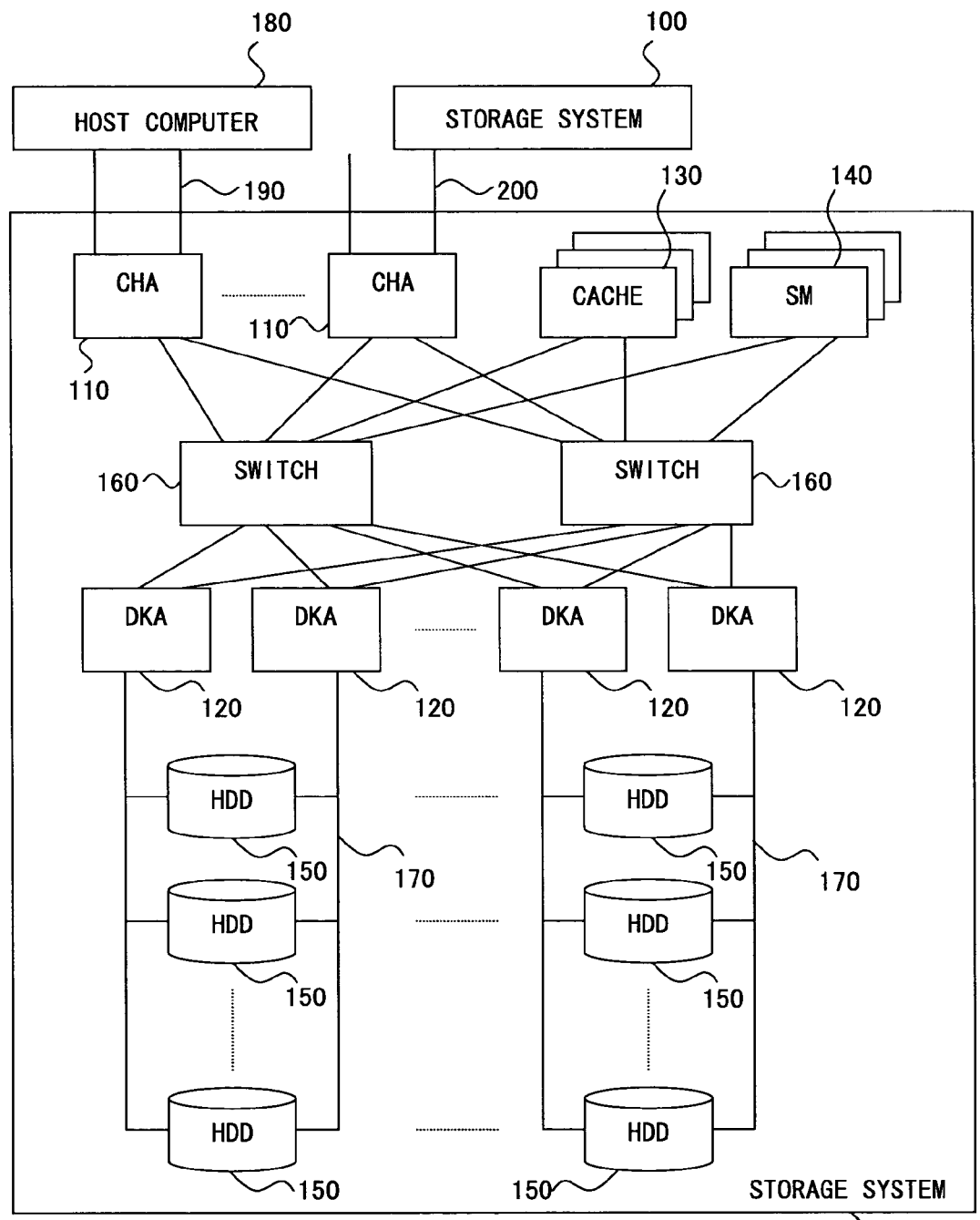
FIG. 2 is a block diagram showing a structure of a storage system composing the computer system according to the first embodiment of this invention.

FIG. 2 is a block diagram showing a structure of the storage system 100 composing the computer system according to the first embodiment of this invention.

In this invention, the storage system 100 includes one or more host adapters (CHAs) 110, one or more disk adapters (DKAs) 120, one or more cache memories (CACHEs) 130, one or more shared memories (SMs) 140, one or more disk drives 150, one or more switches (SWITCHs) 160, and one or more connection lines 170.

The host adapters 110, the disk adapters 120, the cache memories 130, and the shared memories 140 are connected to one another through the switches 160. The disk adapters 120 and the disk drives 150 are connected to one another through the connection lines 170. In addition, a maintenance terminal (not shown) for setting, monitoring, and maintaining the storage system 100 is connected to all the host adapters 110 and the disk adapters 120 through dedicated lines.

The disk drives 150 are, for example, hard disk drives (HDDs). A plurality of disk drives 150 may form a RAID array. Physical volumes are physical storage areas provided by the disk drives 150. The logical volumes 230 that are logical storage areas may be associated to the physical volumes.

The host adapter 110 and the disk adapter 120 are each a control unit (disk drive controller) that stores programs such as the instruction receiving module 210 and controls processings executed by those programs. The host adapter 110 and the disk adapter 120 each include a processor (not shown) and a memory (not shown). The processor executes the programs stored in the memory to control the processings. For example, the programs such as the instruction receiving module 210, the journal read module 240, the difference formation module 265, and the restore module 250 are stored in the memory of the host adapter 110 and executed by the processor of the host adapter 110. Also, the program of the read/write module 220 is stored in the memory of the disk adapter 120 and executed by the processor of the disk adapter 120.

The host adapter 110 includes a communication interface (not shown) for performing communications with the host computer 180, and sends/receives an input/output instruction to control data transfer between the host computer 180 and the cache memory 130. The host adapters 110 is connected to the host computer 180 through the connection path 190 and connected to another storage system 100 through the connection path 200.

The disk adapters 120 controls read, write, or the like of data with respect to the disk drive 150, and also controls the data transfer between the cache memory 130 and the disk drive 150.

The cache memory 130 temporarily stores data received from the host computer 180 and data read out from the disk drive 150.

The shared memory 140 is a memory used by being shared by all the host adapters 110 and all the disk adapters 120 within the storage system 100, and mainly stores control information.

The host adapter 110 is capable of instructing the disk adapter 120 to read or write data by way of the cache memory 130 and the shared memory 140. Further, the host adapter 110 is capable of directly instructing the disk adapter 120 to read or write data.

The cache memory 130 and the shared memory 140 may also be provided within each host adapter 110 or each disk adapter 120.

A user (system administrator or the like) can use the maintenance terminal, the host computer 180, or the like connected to the storage system 100 to perform management of the storage system 100 through a predetermined user interface. Examples of the management of the storage system 100 include setting of an increase/decrease in number of a plurality of disk drives 150, setting of a RAID structure, setting of the connection paths 190 or the connection paths 200, setting of the logical volumes 230, confirmation of an operation state of the storage system 100, identification of a portion troubled when a failure occurred, setting of a subject of failure monitoring and a content of the failure, and setting of a destination to be notified of failure information. It should be noted that the maintenance terminal may be incorporated into the storage system 100, or may be connected to an external portion of the storage system 100.

<Structure of Journal>

The journal is data to be created as information on a data update executed when data (primary logical volume) that is stored in the storage system 100 and is to be remotely copied is updated, and is composed of write data and update information 300.

The write data is a copy of data to be written into the primary logical volume when the host computer 180 updates the data of the primary logical volume.

The update information 300 is information for managing the write data corresponding to each update and the journal itself. The update information 300 includes a time (update time) at which a write instruction is received, a group number, an update number (update number of group information 600 described later), a logical address in the write instruction, a data size of the write data, and the logical address of the journal logical volume storing the write data.

The update time and the update number are identifiers of a data update. In other words, the data update order is identified by the update time and the update number. The data update order may be identified by any one of the update time and the update number. Further, when a created time of the write instruction is included in the write instruction issued from the host computer 180, the created time of the write instruction may be used as the update time in place of a received time of the write instruction.

It should be noted that a single piece of journal record is defined as a set of the update information 300 on a single update and the write data corresponding to the update information 300.

FIG. 3 is an explanatory diagram of an example of update information 300 of a journal according to the first embodiment of this invention.

In the example of FIG. 3, the update information 300 represents information relating to a write instruction received at 22:20:10 (representing hour:min:sec) on Mar. 17, 1999 (301). The write instruction is an instruction to store write data in a location at 700 from the head of the storage area of a logical volume (primary logical volume #1) having a logical volume number of 1 (304). The write data has a data size of 300 (305). The write data of the journal is stored in a location at 1500 from the head of the storage area of a logical volume having a logical volume number of 4 (journal logical volume #4) (306). The logical volume having the logical volume number of 1 belongs to the group 1 (302), and the update concerned is the fourth data update since the start of the data copy in the group 1 (303).

Figure 4:
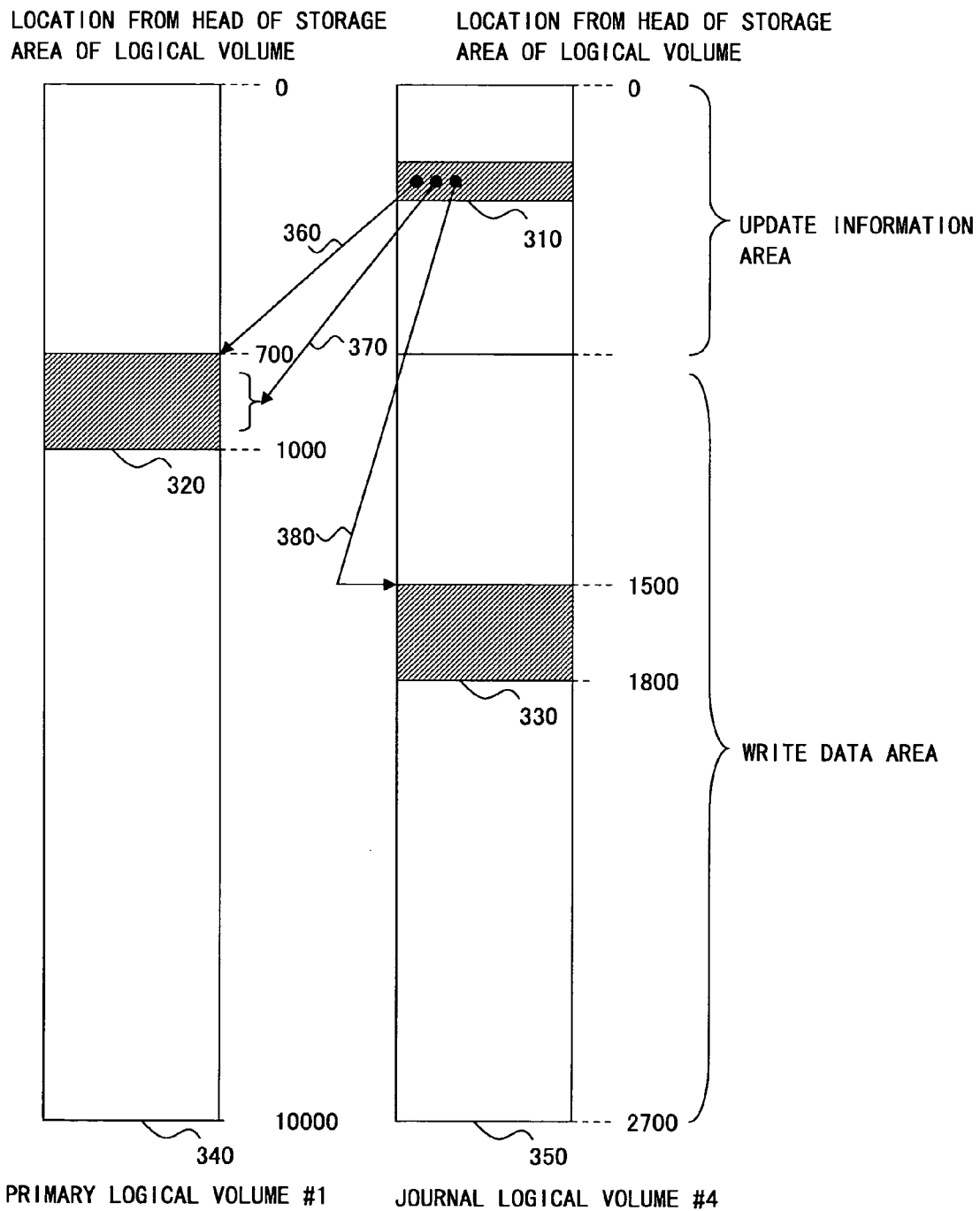
FIG. 4 is an explanatory diagram of a relationship between the update information and write data according to the first embodiment of this invention.

FIG. 4 is an explanatory diagram of a relationship between the update information 300 shown in FIG. 3 and the write data according to the first embodiment of this invention.

FIG. 4 shows a storage area 340 of the primary logical volume #1 and a storage area 350 of the journal logical volume #4. The storage area of a journal logical volume is divided into, for example, an update information area for storing the update information 300 and a write data area for storing the write data.

The update information area stores pieces of the update information 300 in the data update order from the head of the area. After reaching the end of the update information area, the update information 300 is stored from the head of the update information area again. In the example of FIG. 4, the update information 300 is stored in an area 310.

The write data area stores the write data from the head of the area. After reaching the end of the write data area, the write data is stored from the head of the write data area again. In the example of FIG. 4, the write data is stored in an area 330 defined by the logical address (306) and the data size (305) that are included in the update information 300 corresponding to the write data (380).

The ratio between the update information area and the write data area in the storage area of the journal logical volume may be fixed at a predetermined value, and may be set by the maintenance terminal or the host computer 180.

The write data stored in the primary logical volume #1 is stored in a data update area 320 defined by the logical address (304) and the data size (305) that are included in the write instruction (360, 370). As shown in FIG. 14, those pieces of information are held as pointer information 700.

In this embodiment, as shown in FIG. 4, the journal logical volume is divided into the update information area and the write data area. However, without being divided, the journal logical volume may store the update information 300 and its corresponding write data from the head of the storage area. In other words, it is possible that the update information 300 relating to the first update is stored in a head area of the journal logical volume, the write data relating to the first update is stored in an area subsequent to the head area, the update information 300 relating to the second update is stored in a further subsequent area, and the write data relating to the second update is stored in a still further subsequent area.

<Structure of Volume Information>

Next, description will be made of the volume information 400 held by the storage system 100.

FIG. 5 is an explanatory diagram of the volume information 400 held by the storage system A according to the first embodiment of this invention. FIG. 6 is an explanatory diagram of the volume information 400 held by the storage system B according to the first embodiment of this invention. FIG. 7 is an explanatory diagram of the volume information 400 held by the storage system C according to the first embodiment of this invention.

The volume information 400 is information for managing the logical volumes 230 included in the respective storage systems 100, and includes a logical volume number 401, a volume state 402, a format type 403, a capacity 404, a synchronous pair number 405, an asynchronous pair number 406, and a physical address 407 (disk drive number 407a and location from the head 407b). The volume information 400 is stored in a memory that can be referenced by the host adapter 110 and the disk adapter 120, for example, the shared memory 140.

In the volume information 400, the value of the volume state 402 is set as any one of "normal", "primary", "secondary", "abnormal", and "unused".

The logical volume 230 whose volume state 402 is "normal" or "primary" is a logical volume that can normally be accessed from the host computer 180.

The logical volume 230 whose volume state 402 is "secondary" may allow an access from the host computer 180.

The logical volume 230 whose volume state 402 is "primary" is a primary logical volume, i.e., a data copy source at the time of remote copy.

The logical volume 230 whose volume state 402 is "secondary" is a secondary logical volume, i.e., a data copy destination at the time of remote copy.

The logical volume 230 whose volume state 402 is "abnormal" is a logical volume that cannot normally be accessed due to a failure. The failure is, for example, a failure in the disk drive 150 composing the logical volume 230.

The logical volume 230 whose volume state 402 is "unused" is a logical volume that is not in use.

In the volume information 400, the synchronous pair number 405 and the asynchronous pair number 406 are each a number that identifies a pair existing in the logical volumes 230 uniquely within the logical volumes 230 concerned. Those numbers are used for designating the pair information 500 described later. The synchronous pair number 405 and the asynchronous pair number 406 are effective when the volume state 402 of a logical volume are "primary" or "secondary" (in other words, when the logical volume forms a pair).

On the other hand, reference is not made to the synchronous pair number 405 and the asynchronous pair number 406 of the logical volume 230 whose volume state 402 is neither "primary" nor "secondary" (in other words, logical volume 230 that does not form a pair). Therefore, any values may be set as the synchronous pair number 405 and the asynchronous pair number 406 of such a logical volume 230. In FIGS. 5 to 7, the synchronous pair number 405 and the asynchronous pair number 406 of the logical volume 230 that does not form a pair are represented by "-".

It should be noted that an invalid value (for example, "0") is set as the value of the asynchronous pair number 406 of the logical volume 230 belonging only to a synchronous pair and the value of the synchronous pair number 405 of the logical volume 230 belonging only to an asynchronous pair.

In FIG. 5, for example, the logical volume 230 having the logical volume number of 1 has a format type of "OPEN3" (403), has a capacity of 3 GB (404), stores data from the head of the storage area of the disk drive 150 having a disk drive number of 1 (407), can be accessed from the host computer 180, and is a primary logical volume (402).

<Structure of Pair Information>

Next, description will be made of the pair information 500 held by the storage system 100.

FIG. 8 is an explanatory diagram of the pair information 500 held by the storage system A according to the first embodiment of this invention. FIG. 9 is an explanatory diagram of the pair information 500 held by the another storage system B according to the first embodiment of this invention. FIG. 10 is an explanatory diagram of the pair information 500 held by the further another storage system C according to the first embodiment of this invention.

The pair information 500 is information for managing pairs of the logical volumes 230 included in the respective storage systems 100, and includes a pair number 501, a pair state 502, a primary storage system number 503, a primary logical volume number 504, a secondary storage system number 505, a secondary logical volume number 506, a group number 507, a copied address 508, and a difference bitmap (BM) location 509. The pair information 500 is stored in a memory that can be referenced by the host adapter 110 and the disk adapter 120, for example, the shared memory 140.

In the pair information 500, the pair number 601 is an identifier that identifies a pair existing in the storage systems 100 uniquely within the storage systems 100 concerned. The pair number 501 corresponds to the synchronous pair number 405 and asynchronous pair number 406 of the volume information 400.

The values of the pair state 502 include "normal", "abnormal", "unused", "uncopied", and "copying".

The value "normal" represents that the remote copy of the logical volume 230 is normally performed.

The value "abnormal" represents that the remote copy of the logical volume 230 cannot be performed due to a failure. The failure is, for example, breakage of the connection path 200.

The value "unused" represents that there exist no pairs corresponding to the pair number 501. In other words, the pair information corresponding to the pair number 501 is not effective.

The value "copying" represents that an initial copy processing is under execution. The "initial copy processing" used herein is a processing for remote copy that is first executed for forming a pair of the logical volumes 230.

The value "uncopied" represents that the initial copy processing has not been executed yet.

The primary storage system number 503 is a number for identifying the primary storage system 100 including the primary logical volume 230 belonging to the pair concerned.

The primary logical volume number 504 is a number for identifying the primary logical volume 230 belonging to the pair concerned within the primary storage system 100.

The secondary storage system number 505 is a number for identifying the secondary storage system 100 including the secondary logical volume 230 belonging to the pair concerned.

The secondary logical volume number 506 is a number for identifying the secondary logical volume 230 belonging to the pair concerned within the secondary storage system 100.

The group number 507 is the number of a group to which the primary logical volume 230 belongs in the primary storage system 100, and the number of a group to which the secondary logical volume 230 belongs in the secondary storage system 100.

The copied address 508 is used for the initial copy processing.

The difference BM location 509 represents the storage location of a difference BM corresponding to the pair concerned. The difference BM location 509 is, for example, a storage location in the shared memory 140. The difference BM will be described in detail later.

In FIG. 8, for example, a pair whose pair number 501 is "1" is formed of the primary logical volume 230 having the logical volume number of 1 within the primary storage system A and the secondary logical volume 230 having the logical volume number of 1 within the secondary storage system B, in which the remote copy is normally executed. In addition, the difference BM corresponding to the pair concerned is stored in a location of "aaa". The value "aaa" represents a predetermined address within the shared memory 140.

<Structure of Group Information>

Next, description will be made of the group information 600 held by the storage system 100.

FIG. 11 is an explanatory diagram of the group information 600 held by the storage system A according to the first embodiment of this invention. FIG. 12 is an explanatory diagram of the group information 600 held by the another storage system B according to the first embodiment of this invention. FIG. 13 is an explanatory diagram of the group information 600 held by the further another storage system C according to the first embodiment of this invention.

The group information 600 includes a group number 601, a group state 602, a pair set 603, a journal logical volume number 604, an update number 605, a copy type 606, a counterpart storage system number 607, and a counterpart group number 608. The group information 600 is stored in the memory that can be referenced by the host adapter 110 and the disk adapter 120, for example, the shared memory 140.

In the group information 600, the group number 601 is an identifier that identifies a group to which the logical volumes 230 included in the storage systems 100 belong, uniquely within the storage systems 100 concerned. The group number 601 corresponds to the group number 507 of the pair information 500.

The values of the group state 602 include "normal", "abnormal", "unused", "stop", and "not ready".

The value "normal" represents that the pair state 502 of at least one pair among a pair set is "normal".

The value "abnormal" represents that the pair states 502 of all pairs among a pair set is "abnormal".

The value "unused" represents that there exists no group corresponding to the group number 601. In other words, the group information corresponding to the group number 601 is not effective.

The value "stop" represents that the creation of a journal record is not performed temporarily in the primary storage system 100. This setting is applied to a case of temporarily stopping the creation of a journal record when the group state 602 is "normal". On the other hand, the value "stop" represents that the journal read processing is not performed temporarily in the secondary storage system 100. This setting is applied to a case of temporarily stopping the reading of a journal record from the primary storage system 100 when the group state 602 is "normal".

The value "not ready" represents that either the setting of a pair or a group or the initial copy processing has not been completed yet.

The pair set 603 includes the pair numbers 501 of all the pairs belonging to the group number 601.

The journal logical volume number 604 represents the logical volume number 401 of the journal logical volume 230 belonging to a group of the group number 601. When the journal logical volume 230 belonging to the group concerned does not exist, an invalid value (for example, "0") is set as the journal logical volume number 604.

The update number 605 has an initial value of "1", to which 1 is added each time the journal is updated. The update number 605 is copied as the update number 303 to the update information 300 of the journal record, and is used for maintaining the data update order in the restore processing described later.

The copy type 606 is information representing a system of remote copy, and is selected from "synchronous" and "asynchronous". When the copy type 606 is "synchronous", the synchronous remote copy is executed for the pair included in the group concerned. On the other hand, when the copy type 606 is "asynchronous", the asynchronous remote copy is executed for the pair included in the group concerned.

In the primary storage system 100, the counterpart storage system number 607 is a storage system number of the storage system 100 including the secondary logical volume 230 of the pair belonging to the group concerned. In the secondary storage system 100, the counterpart storage system number 607 is the storage system number of the storage system 100 including the primary logical volume 230 of the pair belonging to the group concerned.

In the primary storage system 100, the counterpart group number 608 is the group number 601 of a group to which the secondary logical volume 230 of the pair belonging to the group concerned. In the secondary storage system 100, the counterpart group number 608 is the group number 601 of a group to which the primary logical volume 230 of the pair belonging to the group concerned.

In FIG. 11, for example, the group whose group number 601 is "1" is formed of the logical volumes 230 belonging to the pairs whose pair numbers 501 are "1" and "2" (603). In other words, the group is formed of the primary logical volumes 230 whose logical volume numbers are "1" and "2" and the journal logical volume 230 whose logical volume number is "4" (see the pair information 500). A synchronous data copy processing is performed normally for those logical volumes 230 (602, 606).

<Structure of Pointer Information>

Next, description will be made of the pointer information 700 held by the storage system 100.

Figure 15:
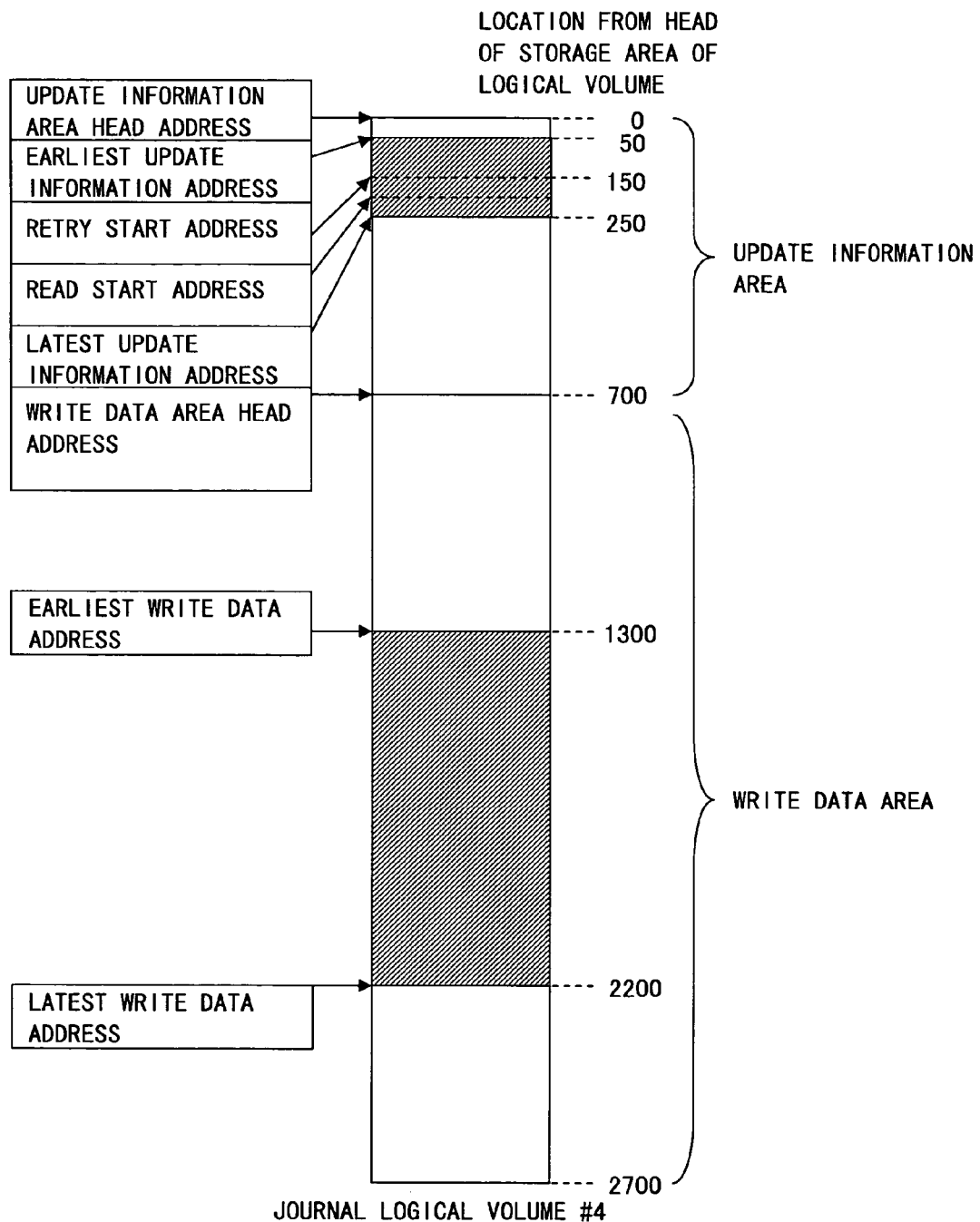
FIG. 15 is an explanatory diagram of a journal logical volume corresponding to the pointer information according to the first embodiment of this invention.

FIG. 14 is an explanatory diagram of the pointer information 700 held by the storage system A according to the first embodiment of this invention. FIG. 16 is an explanatory diagram of the pointer information 700 held by the another storage system B according to the first embodiment of this invention. FIG. 17 is an explanatory diagram of the pointer information 700 held by the further another storage system C according to the first embodiment of this invention. Also, FIG. 15 is an explanatory diagram of the journal logical volume 230 journal logical volume #4) corresponding to the pointer information 700 (FIG. 14) according to the first embodiment of this invention.

The pointer information 700 is information for managing the journal logical volume 230, and includes an update information area head address 701, a write data area head address 702, a latest update information address 703, an earliest update information address 704, a latest write data address 705, an earliest write data address 706, a read start address 707, and a retry start address 708.

In the pointer information 700, the update information area head address 701 is a head logical address of a storage area (update information area) storing the update information 300 of the journal logical volume 230.

The write data area head address 702 is a head logical address of a storage area (write data area) storing the write data of the journal logical volume 230.

The latest update information address 703 is a head logical address of an area that stores the update information 300 of a journal record to be stored subsequently.

The earliest update information address 704 is a head logical address of an area that stores the update information 300 of an earliest journal record (in other words, one whose update number 303 is small).

The latest write data address 705 is a head logical address of an area that stores the write data of the journal record to be stored subsequently.

The earliest write data address 706 is a head logical address of an area that stores the write data for the earliest journal record (in other words, one whose update number 303 is small).

The read start address 707 and the retry start address 708 are used for the journal read processing described later.

In the example of the pointer information 700 shown in FIGS. 14 and 15, the update information area of the journal corresponds to a storage area from the head to a location of 699 of the logical volume journal logical volume #4) having the logical volume number of 4. On the other hand, the write data area of the journal corresponds to a storage area from a location of 700 to a location of 2699 of the journal logical volume #4.

The update information 300 of the journal is stored in a storage area from a location of 50 to a location of 249 of the journal logical volume #4, and the update information 300 of the journal record to be stored subsequently is stored in an area starting from a location of 250.

The write data of the journal is stored in a storage area from a location of 1300 to a location of 2199 of the journal logical volume #4, and the write data of the journal record to be stored subsequently is stored in a storage area starting from a location of 2200.

The volume information 400, the pair information 500, the group information 600, and the pointer information 700 are preferably stored in the shared memory 140. However, those pieces of information may be stored in an area other than the shared memory 140. For example, those pieces of information may be concentrated on and stored in one of the cache memory 130, the host adapter 110, the disk adapter 120, and the disk drive 150, and may be distributed to part or all thereof and stored therein.

In this embodiment, a single journal logical volume 230 is allocated to a single group. However, a plurality of journal logical volumes 230 may be allocated to a single group. For example, two journal logical volumes 230 are allocated to a single group, the pointer information 700 is provided for each journal logical volume 230, and journal records are stored alternately in the two journal logical volumes 230. Accordingly, writing of journal records to the disk drive 150 is distributed, which is expected to lead to improvement in performance. The reading performance for a journal record also improves.

Alternatively, the two journal logical volumes 230 are allocated to a single group, and only one journal logical volume 230 is usually used. The other journal logical volume 230 is used in a case of a decrease in performance of the journal logical volume 230 that is being used, a case where the journal logical volume 230 cannot be used due to a failure, or other such cases. The case of a decrease in performance is, for example, a case where the storage area of the journal logical volume 230 has a RAID structure composed of a plurality of disk drives 150, and one of the disk drives 150 composing the RAID structure has a failure.

<Operation of Instruction Receiving Processing>

Figure 18:
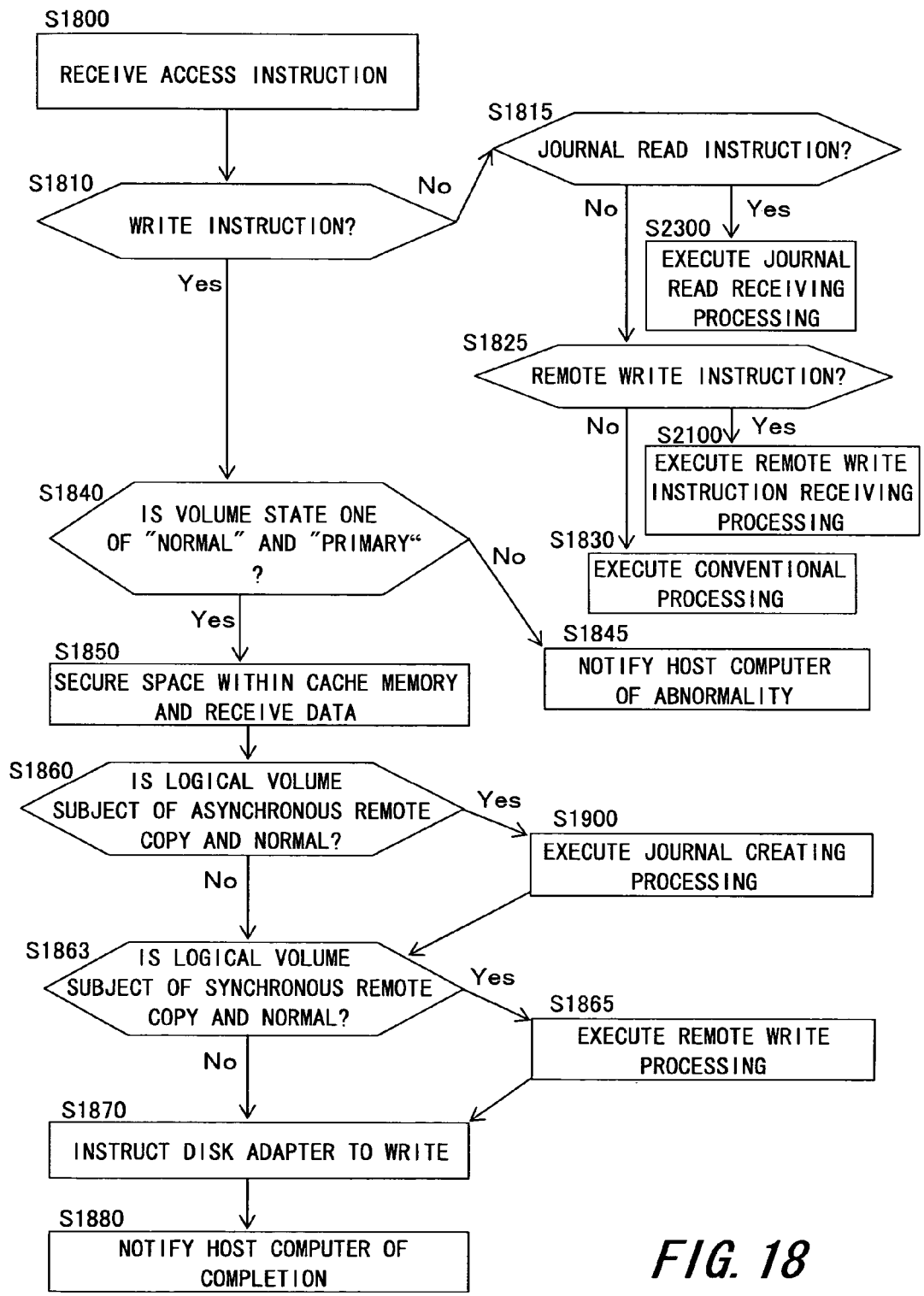
FIG. 18 is a flowchart of an instruction receiving processing according to the first embodiment of this invention.

Next, FIG. 18 will be referenced to describe an instruction receiving processing executed by the instruction receiving module 210. The instruction receiving processing is executed when the storage system 100 receives an instruction from the host computer 180. The instruction receiving processing has subroutines including a journal creating processing (FIG. 19), a remote write instruction receiving processing (FIG. 21), a journal copying processing (FIG. 22), and a journal read receiving processing (FIG. 23).

FIG. 18 is a flowchart of the instruction receiving processing according to the first embodiment of this invention.

The following (1) to (7) describe an operation in a case where the primary storage system 100A receives from the host computer 180 an instruction to access the logical volume 230 that is a subject of remote copy.

(1) The host adapter 110 within the primary storage system 100A (hereinafter, referred to as "host adapter A") receives an access instruction from the host computer 180. The access instruction includes read (reading of data), write (writing of data), journal read (reading of a journal) described later, and other such instructions, a logical address, and a data size. Hereinafter, the logical address included in the access instruction is referred to as "logical address A", a logical volume included in the access instruction is referred to as "logical volume A", a location within the logical address included in the access instruction is referred to as "intra-logical-address location A", and the data size included in the access instruction is referred to as "data size A" (S1800).

(2) The host adapter A judges whether the received access instruction is a write instruction, a journal read instruction, or a remote write instruction (S1810, S1815, S1825). When the access instruction is judged to be the journal read instruction in the step S1815, a journal read instruction receiving processing is executed as described later with reference to FIG. 23 (S2300). When the access instruction is judged to be the remote write instruction in the step S1825, a remote write instruction receiving processing is executed as described later (S2100). When the received access instruction is neither of the above instructions, a conventional processing is executed. For example, in the case of a read instruction, a conventional read processing is executed (S1830).

(3) When the access instruction is judged to be the write instruction in the step S1810, the volume information 400 of the logical volume A is referenced to judge whether or not the volume state 402 is one of "normal" and "primary" (S1840). As a result, when the volume state 402 of the logical volume A is neither "normal" nor "primary", the logical volume A cannot be accessed, so the host computer 180 is notified of an abnormal end (S1845).

(4) When the volume state 402 of the logical volume A is judged to be one of "normal" and "primary" in the step S1840, the host adapter A secures a space within the cache memory 130, and notifies the host computer 180 that the host adapter A is ready to receive data. Upon reception of a notification to that effect, the host computer 180 sends write data to the primary storage system 100A. The host adapter A receives the write data, and stores the write data in the cache memory 130 (S1850).

(5) The host adapter A references the volume information 400, pair information 500, and group information 600 of the logical volume A, and judges whether or not the logical volume A is a subject of asynchronous remote copy and is normal (S1860).

When it is judged in the step S1860 that: the volume state 402 of the logical volume A is "primary"; the pair state 502 of a pair identified by the asynchronous pair number 406 of the logical volume A is "normal"; and the group state 602 of a group to which the pair belongs is "normal", the logical volume A is the subject of asynchronous remote copy and is normal, so that the journal creating processing is executed as described later (S1900).

(6) When it is judged in the step S1860 that the logical volume A is not the subject of asynchronous remote copy or is not normal, the host adapter A judges whether or not the logical volume A is a subject of synchronous remote copy and is normal (S1863). Also when the journal creating processing (S1900) is successful, the judgment is executed in the step S1863. In the step S1863, the host adapter A references the volume information 400, pair information 500, and group information 600 of the logical volume A.

When it is judged in the step S1863 that: the volume state 402 of the logical volume A is "primary"; the pair state 502 of a pair identified by the synchronous pair number 405 of the logical volume A is "normal"; and the group state 602 of a group to which the pair belongs is "normal", the logical volume A is the subject of synchronous remote copy and is normal. In this case, the host adapter A sends a remote write instruction storing the write data that has been received from the host computer 180 to the secondary storage system B corresponding to the pair identified by the synchronous pair number 405 (S1865).

The remote write instruction is an instruction to store the write data that has been received from the host computer 180 to the secondary storage system by the synchronous remote copy. The remote write instruction includes the write instruction, a logical address (in which the logical volume number is the secondary storage system B corresponding to the pair identified by the synchronous pair number 405, and the location within the logical address is the intra-logical-address location A), the data size A, and the update number 303 used in the step S1900.

It should be noted that the remote write instruction may include the time (update time) 301 at which the write instruction is received from the host computer 180 in place of the update number 303.

On the other hand, when the journal creating processing (S1900) is unsuccessful, a value of "0" indicating invalidity is included as the update number 303.

(7) When it is judged in the step S1863 that the logical volume A is not the subject of synchronous remote copy or is not normal, the host adapter A instructs the disk adapter 120 to "write the write data to a storage area of the disk drive 150 corresponding to the logical address A" (S1870), and notifies the host computer 180 of completion (S1880). Even after reception of a reply to the remote write instruction (S1865), the step S1870 is similarly executed. After that, the disk adapter 120 executes a read/write processing to store the write data in the above-mentioned storage area.

The read/write processing is a processing to be executed by the read/write module 220 of the disk adapter 120 in response to an instruction from the host adapter 110 or the disk adapter 120. To be specific, examples of the read/write processing include a processing of writing the data within the designated cache memory 130 to the storage area within the disk drive 150 corresponding to the designated logical address, and a processing of reading out the data within the designated cache memory 130 from the storage area within the disk drive 150 corresponding to the designated logical address.

It should be noted that in the example of FIG. 18, when the logical volume A is a subject of both synchronous remote copy and asynchronous remote copy, the journal creating processing (S1900) is first executed, followed by the execution of the remote write processing (S1865). This is because the update number 303 obtained by the journal creating processing (S1900) is used for the remote write processing (S1865).

However, in the case of obtaining the update number 303 in advance for use in the journal creating processing (S1900) and the remote write processing (S1865), either the journal creating processing (S1900) or the remote write processing (S1865) may be executed first.

<Operation of Journal Creating Processing>

Next, description will be made of the journal creating processing (S1900).

Figure 19:
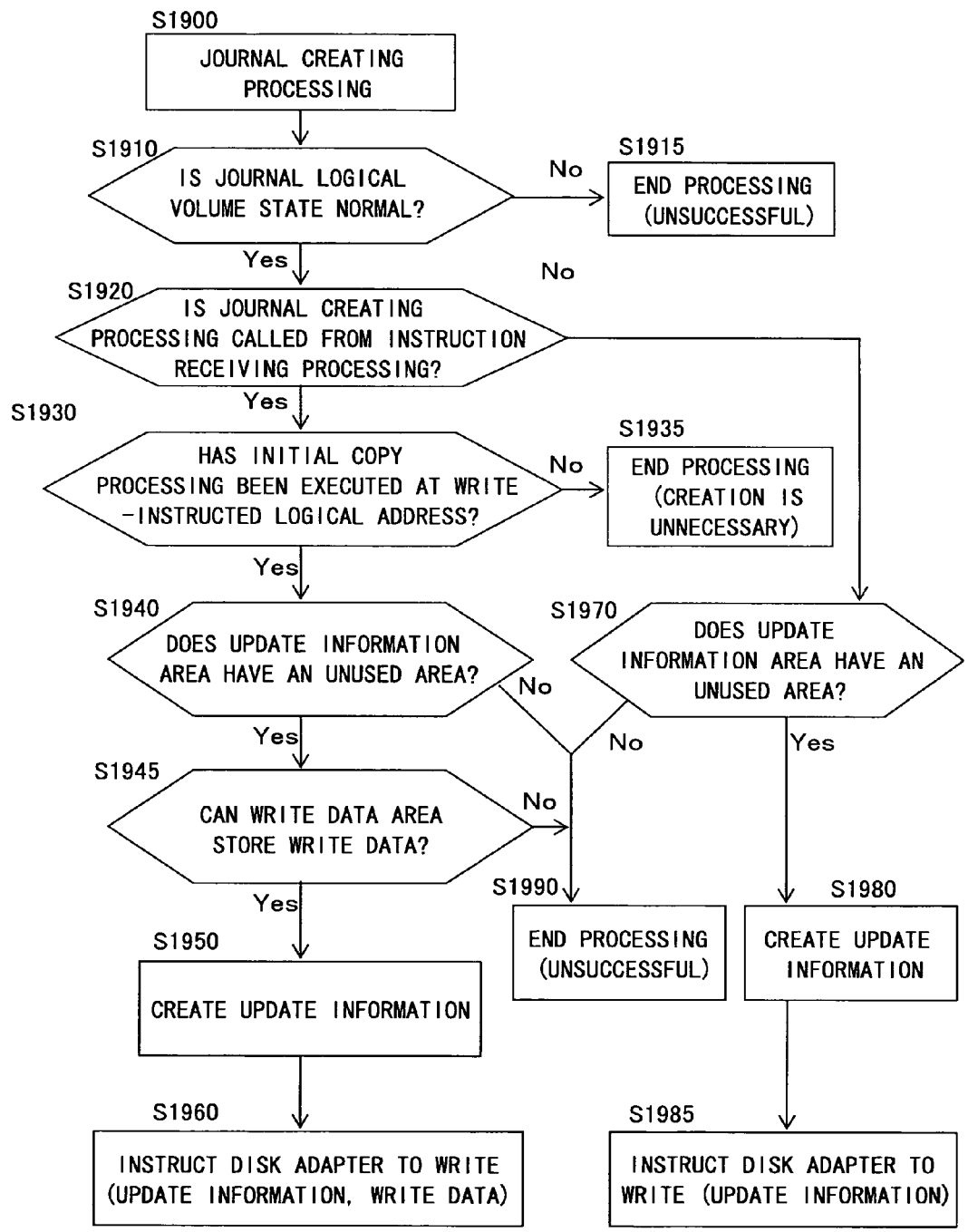
FIG. 19 is a flowchart of a journal creating processing according to the first embodiment of this invention.

FIG. 19 is a flowchart of the journal creating processing according to the first embodiment of this invention.

(1) The host adapter A judges whether or not the volume state 402 of the journal logical volume 230 is "normal" (S1910). In the step S1910, when the volume state 402 of the logical volume A is judged to be "abnormal", the journal logical volume 230 cannot store a journal. Thus, the host adapter A changes the group state 602 into "abnormal" and ends the processing (S1915). This is followed by the execution of, for example, a processing of changing the journal logical volume 230 into a normal logical volume.

(2) When the journal logical volume 230 is judged to be "normal" in the step S1910, the journal logical volume 230 can store a journal. Thus, the journal creating processing continues. The content of the journal creating processing differs depending on whether the journal creating processing is called from the initial copy processing or from the instruction receiving processing (S1920). The term "initial copy processing" used herein represents a processing for the first remote copy that is executed after a pair of logical volumes 230 is formed. When the journal creating processing is called from the instruction receiving processing, a step S1930 and the subsequent steps are executed. When the journal creating processing is called from the initial copy processing, a step S1970 and the subsequent steps are executed.

(3) When the journal creating processing is called from the instruction receiving processing, the host adapter A references the pair state 502 of the pair information 500 to judge whether or not the initial copy processing has been executed at the write-instructed logical address A (S1930).

When the pair state 502 of the logical volume A is "uncopied", the initial copy processing has not been executed at the write-instructed logical address A. In other words, since the initial copy processing is executed later to create a journal record, the journal record is not created here, and the processing ends with the creation of the journal being set to be unnecessary (S1935).

When the pair state 502 of the logical volume A is "copying", the copied address 508 is compared with the intra-logical-address location A. When the copied address 508 is equal to or smaller than the intra-logical-address location A, the initial copy processing has not been executed at the write-instructed logical address A. In other words, since the initial copy processing is executed later to create a journal record, the journal record is not created here, and the processing ends with the creation of the journal being set to be unnecessary (S1935).

On the other hand, when the pair state 502 of the logical volume A is "copying" and the copied address 508 is larger than the intra-logical-address location A, or when the pair state 502 of the logical volume A is "normal", the initial copy processing has been completed at the write-instructed logical address A. Thus, the journal creating processing continues.

(4) Next, the host adapter A judges whether or not the journal logical volume 230 can store a journal record. In other words, the host adapter A references the pointer information 700 to judge whether or not the update information area has an unused area (S1940). When the latest update information address 703 and earliest update information address 704 of the pointer information 700 are equal to each other, the update information area has no unused area, so the journal logical volume 230 cannot store the journal record. Thus, the creation of the journal record is unsuccessful, which ends the processing (S1990).

When the update information area is judged to have an unused area in the step S1940, the pointer information 700 is referenced to judge whether or not the write data area can store write data (S1945). When the value of the earliest write data address 706 is within the range from the latest write data address 705 to a value obtained by adding the data size A to the latest write data address 705, the write data area cannot store the write data. In other words, the journal logical volume 230 cannot store the journal record. Thus, the creation of the journal record is unsuccessful, which ends the processing (S1990).

When it is judged in the step S1945 that the write data area can store the write data, the journal logical volume 230 can store the journal, so the processing advances to a step S1950.

(5) Next, the host adapter A obtains the update number 303, the logical address for storing the update information 300, and the logical address for storing for the write data, and creates the update information 300 within the cache memory 130 (S1950). The update number 303 has a value obtained by adding "1" to the update number 605 of the group information 600 on an object group. Then, the update number 605 is updated to the same value as the update number 303. The logical address for storing the update information 300 is the latest update information address 703 of the pointer information 700. The value of the latest update information address 703 is updated to a value obtained by adding the size of the update information 300 to a current value. The logical address for storing the write data is the latest write data address 705 of the pointer information 700. Then, the value of the latest write data address 705 is updated to a value obtained by adding the data size A to a current value.

In addition to the values obtained as described above, the host adapter A sets the group number 601, the time (update time) at which the write instruction is received, the logical address A included in the write instruction, and the data size A included in the write instruction, as the group number 302, the update time 301, the logical address 304 of the write instruction, and the data size 305 of the write data, respectively, in the update information 300.

For example, in the state indicated by the group information 600 of FIG. 11 and the pointer information 700 of FIG. 14, upon reception of a write instruction to "write data having a data size of "100" to a storage area starting from a location "800" of the primary logical volume #1 belonging to the group 1 (logical volume 230 whose logical volume number is "1")", the update information 300 shown in FIG. 20 is created. At this time, the update number 605 of the group information 600 is "6". When the size of the update information 300 is "50", the latest update information address 703 of the pointer information 700 is "300". The latest write data address 705 is "2300".

(6) Next, the host adapter A instructs the disk adapter 120 to write the update information 300 on the journal record and the write data to the disk drive 150 (S1960).

(7) On the other hand, when the journal creating processing is called from the initial copy processing, the step S1970 and the subsequent steps are executed.

First, the host adapter A judges whether or not the journal record can be created. For that purpose, the pointer information 700 is referenced to judge whether or not the update information area has an unused area (S1970). When the latest update information address 703 and earliest update information address 704 of the pointer information 700 are equal to each other, the update information area has no unused area, so the journal record cannot be created. Thus, the creation of the journal record is unsuccessful, which ends the processing (S1990).

On the other hand, when the latest update information address 703 and earliest update information address 704 of the pointer information 700 are different from each other, the journal record can be created, so the processing advances to a step S1980.

It should be noted that in the initial copy processing, the write data of the journal is read by the primary logical volume, so the write data area is not used. Thus, it is unnecessary to judge whether or not the write data area has an unused area.

(8) Next, the host adapter A creates the update information 300 within the cache memory 130 (S1980). The time (update time) 301 of the update information 300 at which the write instruction is received is a time at which the update number 303 is obtained. The group number 302 is a group number of a group to which the synchronous pair number 405 of the logical volume 230 belongs. The update number 303 is a value obtained by adding "1" to the update number 605 of the group information 600. Then, the update number 605 is updated to the same value as the update number 303. The logical address 304 of the write instruction and the logical address 306 of the journal logical volume storing the write data are set to a logical address at which the initial copy processing is to be executed (the copied address 508 of the pair information 500). The data size 305 of the write data is a unit size for the initial copy processing. The logical address for storing the update information 300 is the latest update information address 703 of the pointer information 700. Then, the value of the latest update information address 703 is updated to a value obtained by adding the size of the update information 300 to a current value.

(9) Next, the host adapter A instructs the disk adapter 120 to write the update information 300 to the disk drive 150, which ends the processing normally (S1985).

In the above description, the update information 300 is stored within the cache memory 130, but the update information 300 may be stored within the shared memory 140 or another memory.

The write data may be asynchronously written to the disk drive 150. In other words, the write data need not be written to the disk drive 150 immediately after the step S1960 or S1985. However, in the case where the host computer 180 issues another write instruction to the logical address A to overwrite the write data of the journal record stored in the cache memory 130, the write data need to be written to the disk drive 150 before reception of latest write data from the host computer 180. Alternatively, the write data may be saved in another cache memory, the location of the cache memory for the save may be stored in the update information 300, and the saved write data may be written later to the disk drive 150 corresponding to the logical address of the journal logical volume 230 of the update information 300.

In the above-mentioned journal creating processing, the journal is stored in the disk drive 150, but a predetermined size of cache memory may be prepared for the journal in the cache memory 130 in advance. In this case, the journal is stored in the cache memory with a top priority, and an excess amount of data that cannot be stored in the cache memory is stored in the disk drive 150. The size of the cache memory for the journal can be set from, for example, the maintenance terminal.

<Operation of Remote Write Instruction Receiving Processing>

Figure 21:
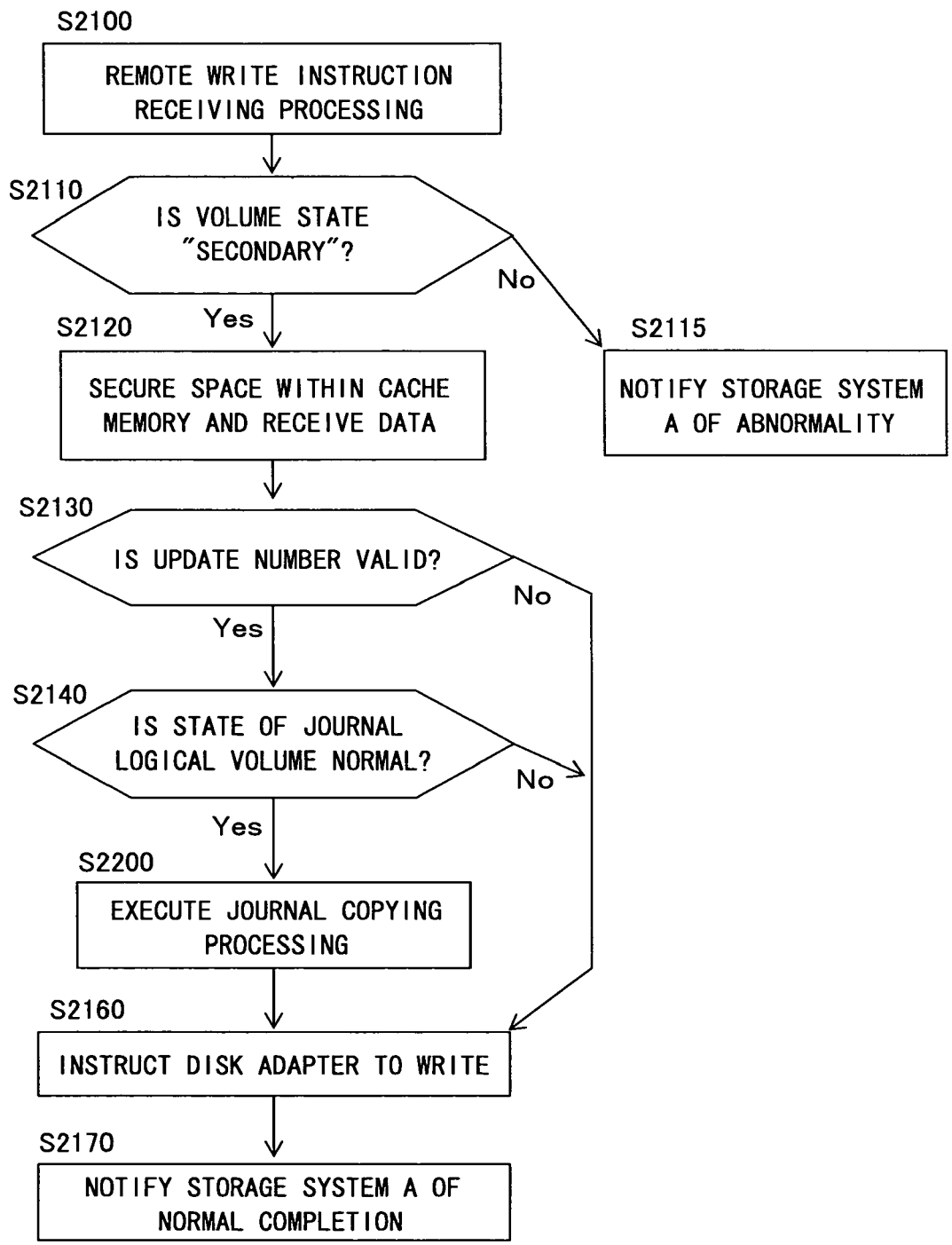
FIG. 21 is a flowchart of a remote write instruction receiving processing according to the first embodiment of this invention.

FIG. 21 is a flowchart of a remote write instruction receiving processing (S2100) according to the first embodiment of this invention.

FIG. 21 shows a processing executed when a host adapter B of the secondary storage system B receives a remote write instruction from the primary storage system A. The remote write instruction includes a write instruction, a logical address (a secondary logical volume B, the intra-logical-address location A), the data size A, and the update number. The update number included in the remote write instruction is the update number 303 obtained by the journal creating processing (S1900).

(1) The host adapter B within the secondary storage system B references the volume information 400 of the secondary logical volume B, and judges whether or not the volume state 402 of the secondary logical volume B is "secondary" (S2110). When it is judged in the step S2110 that the volume state 402 of the secondary logical volume B is not "secondary", the logical volume B cannot be accessed, so the primary storage system A is notified of the abnormal end (S2115).

(2) When the volume state 402 of the secondary logical volume B is judged to be "secondary" in the step S2110, the secondary logical volume B can be accessed. Therefore, the host adapter B secures a space within the cache memory 130, and notifies the primary storage system A that the host adapter B is ready to receive data. Upon reception of a notification to that effect, the primary storage system A sends write data to the secondary storage system B. The host adapter B receives the write data, and stores the write data in the cache memory 130 (S2120).

(3) Next, the update number included in the remote write instruction is referenced. When the update number is a value indicating invalidity (in other words, "0"), the journal has not been created in the primary storage system A, so the journal copying processing (S2200) is not executed (S2130).

(4) On the other hand, when the update number included in the remote write instruction is a valid value (in other words, other than "0"), the volume state 402 of the journal logical volume 230 is referenced. When the volume state 402 of the journal logical volume 230 is judged to be "abnormal", the journal logical volume 230 cannot store the journal. Thus, the journal copying processing (S2200) is not executed (S2140).

Figure 22:
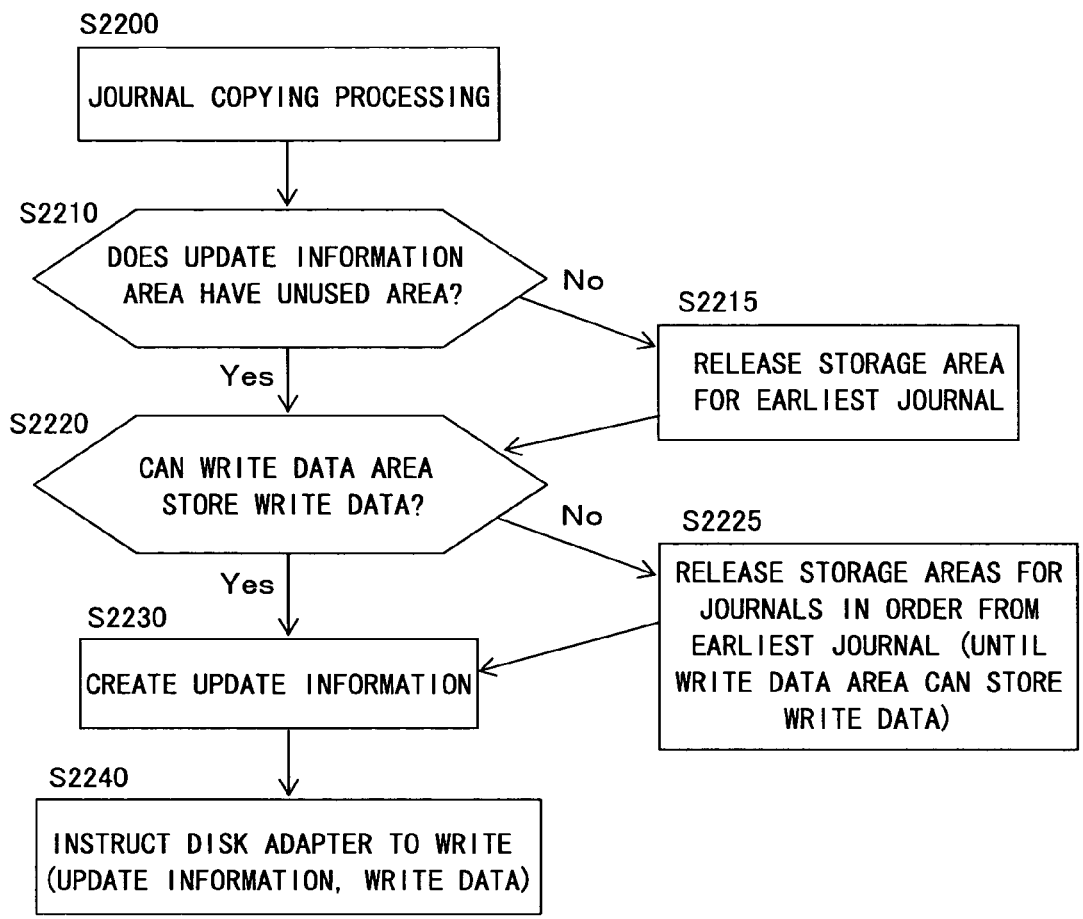
FIG. 22 is a flowchart of a journal copying processing according to the first embodiment of this invention.
Figure 23:
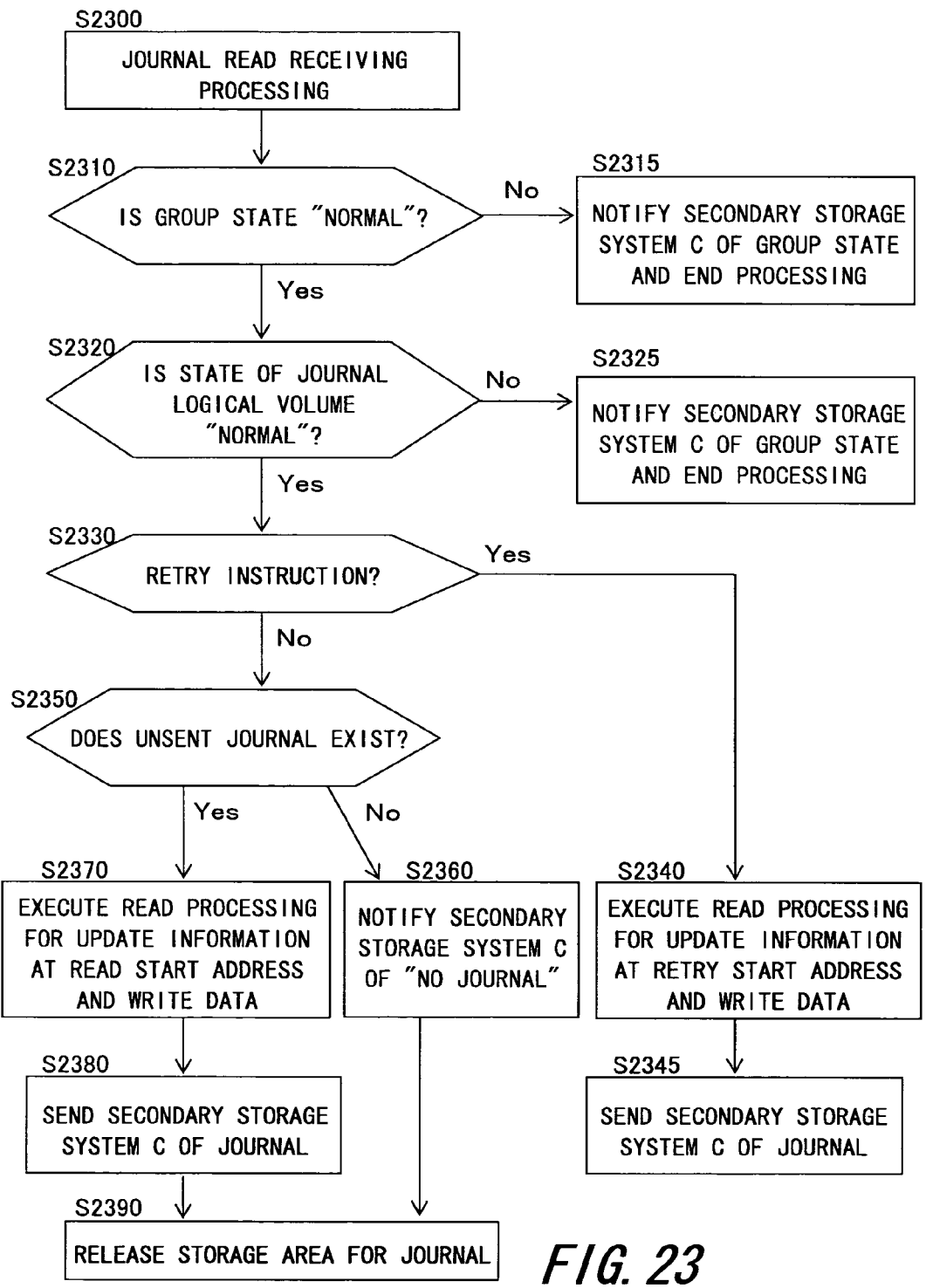
FIG. 23 is a flowchart of a journal read receiving processing according to the first embodiment of this invention.

(5) On the other hand, as shown in FIG. 22, when the volume state 402 of the journal logical volume 230 is judged to be "abnormal" in the step S2140, the journal can be stored in the journal logical volume 230, so the journal copying processing (S2200) is executed.

(6) The host adapter B instructs the disk adapter 120 to "write the write data to a storage area of the disk drive 150 corresponding to the logical address identified by the remote write instruction" (S2160). Then, the primary storage system A is notified of completion (S2170). After that, the disk adapter 120 stores the write data in the above-mentioned storage area by the read/write processing.

<Operation of Journal Copying Processing>

FIG. 22 is a flowchart of the journal copying processing (S2200) according to the first embodiment of this invention.

(1) The host adapter B judges whether or not the journal logical volume 230 can store the journal record. To be specific, the host adapter B references the pointer information 700 to judge whether the update information area has an unused area (S2210). When the latest update information address 703 and earliest update information address 704 of the pointer information 700 are equal to each other, the update information area has no unused area, so the storage area for the earliest journal record is released to secure the update information area (S2215).

Next, the pointer information 700 is referenced to judge whether or not the write data area can store the write data (S2220). When the value of the earliest write data address 706 is within the range from the latest write data address 705 to a value obtained by adding the data size A to the latest write data address 705, the write data area cannot store the write data. Therefore, the storage areas for journal records are released in the order from the earliest journal record to secure the area for storing the write data (S2225).

(2) Next, the host adapter B creates the update information 300 within the cache memory 130 (S2230).

At this time, the time (update time) 301 of the update information 300 at which the write instruction is received is an update time included in the remote write instruction.

The group number 302 is the group number of a group to which a pair, to which the logical volume B belongs, belongs.

The update number 303 is an update number included in the remote write instruction.

The logical address 304 of the write instruction is a logical address included in the remote write instruction.

The data size 305 of the write data is the data size A included in the remote write instruction.

The logical address 306 of the journal logical volume storing the write data is the latest write data address 705 of the pointer information 700. Then, the value of the latest write data address 705 is updated to a value obtained by adding the size of the write data to the value of latest write data address 705.

The logical address for storing the update information 300 is the latest update information address 703 of the pointer information 700. Then, the value of the latest update information address 703 is updated to a value obtained by adding the size of the update information 300 to the value of latest update information address 703.

(3) The host adapter B instructs the disk adapter 120 to "write the update information 300 and the write data to the disk drive 150". The creation of the journal is successful, which ends the processing (S2240). After that, the disk adapter 120 writes the update information 300 and the write data in the disk drive 150 by the read/write processing to release the cache memory 130.

As described above, in the computer system according to this embodiment, the secondary storage system B holds a plurality of journals that are most updated at all times while releasing the storage areas for the journal records in the order from the earliest one.

<Operation of Journal Read Receiving Processing>

FIG. 23 is a flowchart of the journal read receiving processing (S2300) according to the first embodiment of this invention.

FIG. 23 will be referenced to describe a processing executed when the primary storage system A receives a journal read instruction from the secondary storage system C according to the following (1) to (8).

(1) The host adapter A within the primary storage system A receives an access instruction from the secondary storage system C. The access instruction includes an identifier indicating that the access instruction is a journal read instruction, the group number of an instructed group, and presence/absence of a retry instruction. Hereinafter, the group number included in the access instruction is a group number D (S2300).

(2) The host adapter A judges whether or not the group state 602 of the group number D is "normal" (S2310). When it is judged in the step S2310 that the group state 602 is not "normal" (for example, "abnormal"), the host adapter A notifies the secondary storage system C of the group state and ends the processing (S2315). At this time, the secondary storage system C ends the journal read processing.

(3) When it is judged in the step S2310 that the group state 602 of the group number D is "normal", the host adapter A judges the volume state 402 of the journal logical volume 230 (S2320).

When it is judged in the step S2320 that the volume state 402 of the journal logical volume 230 is not "normal" (for example, "abnormal"), the host adapter A changes the group state 602 into "abnormal", notifies the secondary storage system 100C of the group state, and ends the processing (S2325). At this time, the secondary storage system 100C ends the journal read processing.

(4) On the other hand, when it is judged in the step S2320 that the volume state 402 of the journal logical volume 230 is "normal", the host adapter A judges whether or not the journal read instruction is the retry instruction (S2330).

(5) When it is judged in the step S2330 that the journal read instruction is the retry instruction, the host adapter A sends the journal record that was sent previously to the secondary storage system C again. The host adapter A secures a space within the cache memory 130, and instructs the disk adapter 120 to "read out information on the size of the update information 300 from the retry start address 708 of the pointer information 700 and store the information in the cache memory 130".

According to the read/write processing, the disk adapter 120 reads out the update information 300 from the disk drive 150 to store the update information 300 in the cache memory 130, and notifies the host adapter A of read completion of the update information 300.

Upon reception of the notification of the read completion of the update information 300, the host adapter A obtains the logical address 304 of the write instruction and the data size 305 of the write data from the update information 300, and secures a space within the cache memory 130. Then, the host adapter A instructs the disk adapter 120 to "read out the write data and store the write data in the cache memory 130" (S2340).

According to the read/write processing, the disk adapter 120 reads out the write data from the disk drive 150 to store the write data in the cache memory 130, and notifies the host adapter A of read completion of the write data.

Upon reception of the notification of the read completion of the write data, the host adapter A sends the update information 300 and the write data to the secondary storage system C, and releases the cache memory 130 storing the journal record to end the processing (S2345).

(6) When it is judged in the step S2330 that the journal read instruction is not the retry instruction, the host adapter A judges whether or not there exists any journal record left unsent, and when such a journal record exists, sends the journal record to the secondary storage system C. To be specific, the host adapter A compares the read start address 707 and latest update information address 703 of the pointer information 700 (S2350).

When the read start address 707 is equal to the latest update information address 703, all the journal records have been sent to the secondary storage system C. Thus, the host adapter A sends information indicating "no journal" to the secondary storage system C (S2360), and releases the storage area for the journal record that was sent to the secondary storage system C in response to the previous journal read instruction (S2390).

According to a processing of releasing the storage area for the journal record, the retry start address 708 is set as the earliest update information address 704 of the pointer information 700. When the earliest update information address 704 becomes the write data area head address 702, the earliest update information address 704 is set to "0". The earliest write data address 706 of the pointer information 700 is updated to a value obtained by adding thereto the data size 305 of the write data that was sent in response to the previous journal read instruction. Upon reaching a logical address equal to or exceeding the capacity of the journal logical volume 230, the earliest write data address 706 is updated to a value obtained by subtracting therefrom the write data area head address 702.

(7) When the read start address 707 is judged to be different from the latest update information address 703 in the step S2350, there exists an unsent journal record. In this case, the host adapter A secures a space within the cache memory 130, and instructs the disk adapter 120 to "read out information on the size of the update information 300 from the read start address 707 of the pointer information 700 and store the information in the cache memory 130".

According to the read/write processing, the disk adapter 120 reads out the update information 300 from the disk drive 150 to store the update information 300 in the cache memory 130, and notifies the host adapter A of read completion of the update information 300.

Upon reception of the notification of the read completion of the update information 300, the host adapter A obtains the logical address 304 of the write instruction and the data size 305 of the write data from the update information 300, and secures a space within the cache memory 130. Then, the host adapter A instructs the disk adapter 120 to "read out the write data and store the write data in the cache memory 130" (S2370).

According to the read/write processing, the disk adapter 120 reads out the write data from the disk drive 150 to store the write data in the cache memory 130, and notifies the host adapter A of read completion of the write data.

Upon reception of the notification of the read completion of the write data, the host adapter A sends the update information 300 and the write data to the secondary storage system C (S2380), and releases the cache memory 130 storing the journal record. Then, the read start address 707 is set as the retry start address 708 of the pointer information 700. After that, the value of the read start address 707 is updated to a value obtained by adding thereto the size of the update information 300 on the sent journal.

(8) The host adapter A releases the storage area for the journal record that was sent to the secondary storage system C in response to the previous journal read instruction (S2390).

In the above-mentioned journal read receiving processing, the primary storage system A sends a plurality of journal records to the secondary storage system C one by one, but may send the plurality of journal records to the secondary storage system C simultaneously. The number of journal records sent by a single journal read instruction may be designated by the secondary storage system C according to the journal read instruction, or may be designated by a user with respect to the primary storage system A and the secondary storage system C upon group registration. Alternatively, the number of journal records sent by a single journal read instruction may be dynamically changed depending on the transfer performance of and a load on the connection path 200 between the primary storage system A and the secondary storage system C. Further, instead of taking the number of journal records into consideration, the transfer amount of the journal records may be designated with the size of the write data of the journal records taken into consideration.

In the above-mentioned journal read receiving processing, the journal record is read out from the disk drive 150 and stored in the cache memory 130. However, when the journal exists within the cache memory 130, the above procedure is unnecessary.

In the above-mentioned journal read receiving processing, the storage area for the journal record is released when the subsequent journal read instruction (excluding the retry instruction) is processed, but may be released immediately after the journal record is sent to the secondary storage system C. Alternatively, the secondary storage system C may include the update number of the journal record that can be released within the journal read instruction, and the primary storage system A may release the storage area of the journal record according to the instruction.

<Operation of Journal Read Processing>

Figure 24:
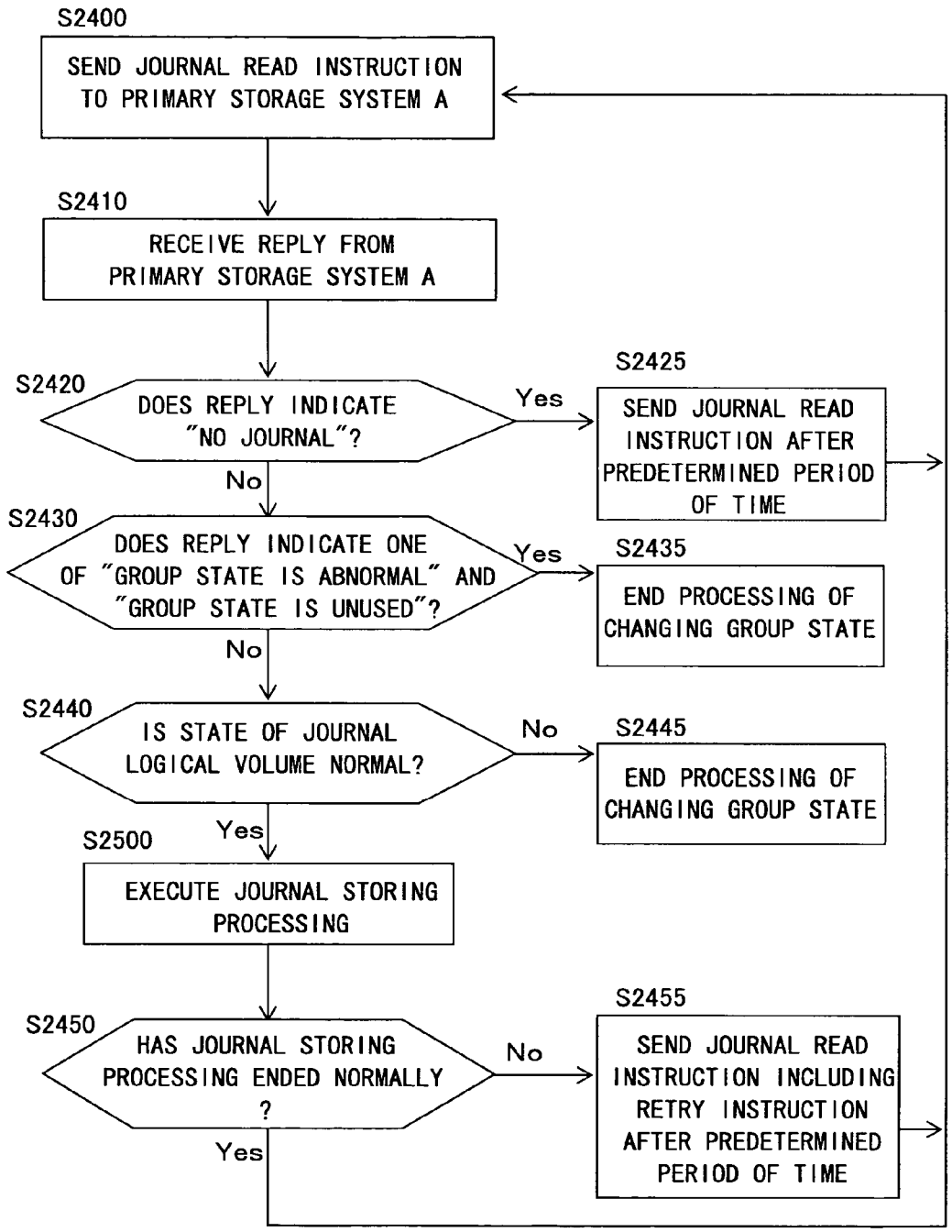
FIG. 24 is a flowchart of a journal read processing according to the first embodiment of this invention.

FIG. 24 is a flowchart of the journal read processing according to the first embodiment of this invention.

The journal read processing is a processing executed by the journal read (JNLRD) module 240.

FIG. 24 will be referenced to describe a procedure where the host adapter C of the secondary storage system C reads out the journal record from the primary storage system A and stores the journal record in the journal logical volume 230 according to the following (1) to (6).

(1) When the group state 602 is "normal" and the copy type 606 is "asynchronous", the host adapter C of the secondary storage system C secures a space within the cache memory 130 to store the journal record, and sends to the primary storage system A the access instruction that includes the identifier indicating that the access instruction is a journal read instruction, the group number of the instructed primary storage system A, and the presence/absence of the retry instruction. Hereinafter, the group number included in the access instruction is referred to as a group number C (S2400).

(2) The host adapter C receives a reply from the primary storage system A and the journal record (S2410). The host adapter C judges whether or not the received reply indicates "no journal" (S2420). When the received reply indicates "no journal", there exists no journal record for the designated group in the primary storage system A. Thus, after a predetermined period of time, the host adapter C sends the journal read instruction to the primary storage system A (S2425).

(3) When the reply from the primary storage system A is one of "group state 602 is abnormal" and "group state 602 is unused", the host adapter C changes the group state of the secondary storage system C into the group state 602 received by the reply and ends the journal read processing (S2430, S2435).

(4) When the reply from the primary storage system A is neither of the above, in other words, in the case of "normal completion", it is judged whether or not the volume state 402 of the journal logical volume 230 is normal (S2440). When the volume state 402 of the journal logical volume 230 is "abnormal", the journal logical volume 230 cannot store the journal. Therefore, the group state 602 is changed into "abnormal" to end the processing (S2445). This is followed by the execution of, for example, a processing of changing the journal logical volume 230 into a normal logical volume, which returns the group state to normal.

(5) When the volume state 402 of the journal logical volume 230 is judged to be "normal" in the step S2440, a journal storing processing (S2500) described later is executed. When the journal storing processing (S2500) ends normally (S2450), the processing returns to the step S2400 to send the subsequent journal read instruction. At this time, after a predetermined period of time, the subsequent journal read instruction may be sent.

The subsequent journal read instruction may be sent at a predetermined time interval on a regular basis. Alternatively, the subsequent journal read instruction may be sent at a timing determined by the number of received journals, communication traffic of the connection path 200, the capacity of the journal held by the secondary storage system C, a load on the secondary storage system 100C, or the like. Further, the capacity of the journal held by the primary storage system A and the pointer information 700 of the primary storage system A may be read out from the secondary storage system C, and the instruction may be sent at a timing determined based on the values thereof.

The above-mentioned transfer of the information may be executed by a dedicated instruction, and the information may be included in the reply to the journal read instruction. The subsequent processings are the same as those of the step S2400 and the subsequent steps.

(6) On the other hand, when the journal storing processing (S2500) does not end normally (S2450), the unused area of the journal logical volume 230 is insufficient, so the received journal record is discarded, and the journal read instruction including the retry instruction is sent after a predetermined period of time (S2455). Alternatively, the journal record is stored in the cache memory 130, and the journal storing processing is executed again after a predetermined period of time. This is because the restore processing (S2600) described later is executed, and thus, the unused area may increase after a predetermined period of time. In this case, the journal read instruction need not include the presence/absence of the retry instruction.

<Operation of Journal Storing Processing>

Figure 25:
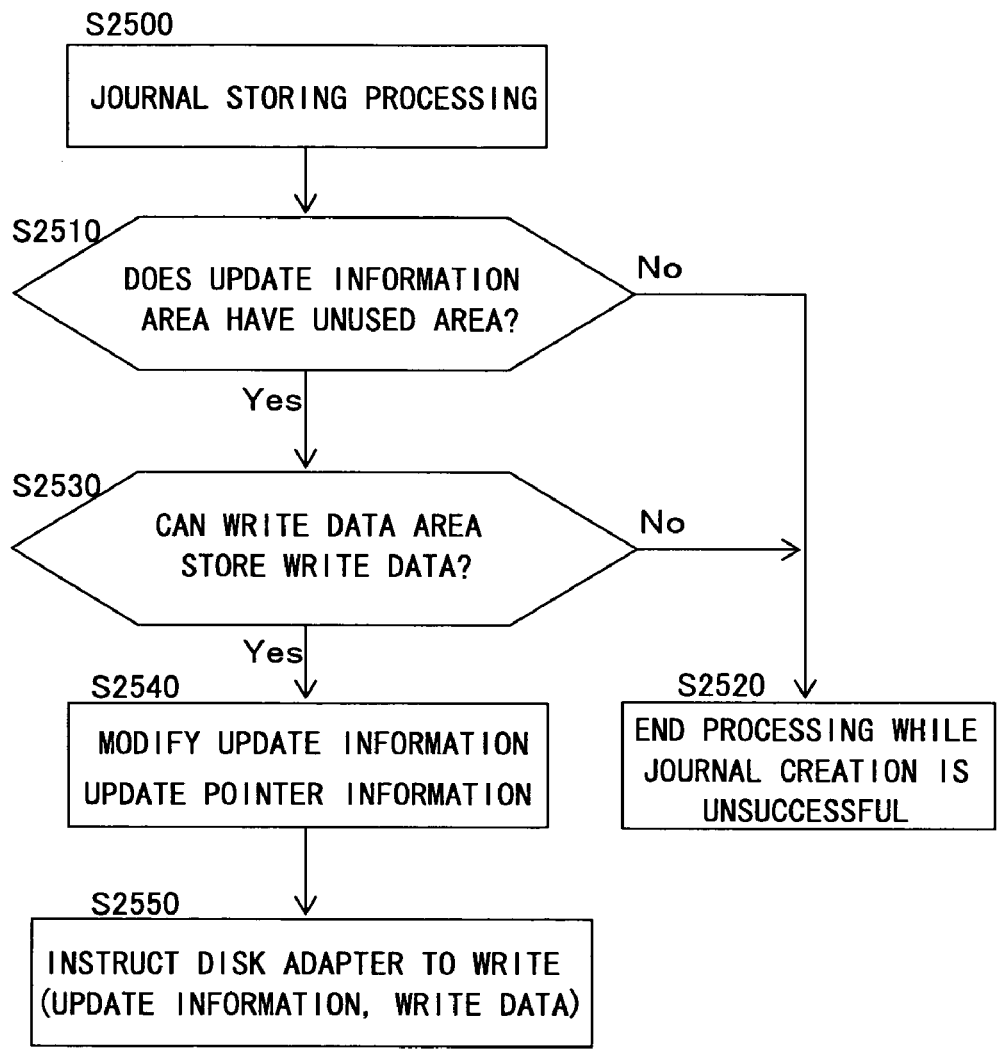
FIG. 25 is a flowchart of a journal storing processing according to the first embodiment of this invention.

FIG. 25 is a flowchart of the journal storing processing (S2500) according to the first embodiment of this invention.

(1) The host adapter C judges whether or not the journal logical volume 230 can store the journal record. To be specific, the host adapter C references the pointer information 700 to judge whether or not an update information area has an unused area (S2510). When the latest update information address 703 is equal to the earliest update information address 704, the update information area has no unused area, so the creation of the journal record is unsuccessful, which ends the processing (S2520).

(2) When it is judged that the update information area has an unused area in the step S2510, it is judged whether or not the write data area can store the write data by referencing the pointer information 700 (S2530). When the value of the earliest write data address 706 is within the range from the latest write data address 705 to a value obtained by adding the data size A to the latest write data address 705, the write data area cannot store the write data. Therefore, the creation of the journal record is unsuccessful, which ends the processing (S2520).

(3) When the journal logical volume 230 can store the journal record, the host adapter C changes the group number 302 of the received update information 300 and the logical address 306 of the journal logical volume storing the write data. The group number 302 is changed into the group number of the secondary storage system C, and the logical address 306 of the journal logical volume is changed into the latest write data address 705 of the pointer information 700.

Further, the host adapter C changes the latest update information address 703 of the pointer information 700 into a value obtained by adding the size of the update information 300 to the value of the latest update information address 703, and the latest write data address 705 is changed into a value obtained by adding the size of the write data to the latest write data address 705.

Further, the host adapter C changes the update number 605 of the group information 600 into the update number 303 of the received update information 300 (S2540).

(4) The host adapter C instructs the disk adapter 120 to "write the update information 300 and the write data to the disk drive 150", and ends the processing while the creation of the journal record is successful (S2550). After that, the disk adapter 120 writes the update information 300 and the write data in the disk drive 150 by the read/write processing to release the cache memory 130.

In the above-mentioned journal storing processing, the journal is stored in the disk drive 150, but a predetermined size of cache memory 130 may be prepared for the journal in advance, and the journal may be stored in the cache memory 130. In this case, the journal record is stored in the cache memory 130 with a top priority, and an excess amount of data that cannot be stored in the cache memory 130 is stored in the disk drive 150. The size of the cache memory 130 for the journal can be set from, for example, the maintenance terminal.

<Operation of Restore Processing>

Figure 26:
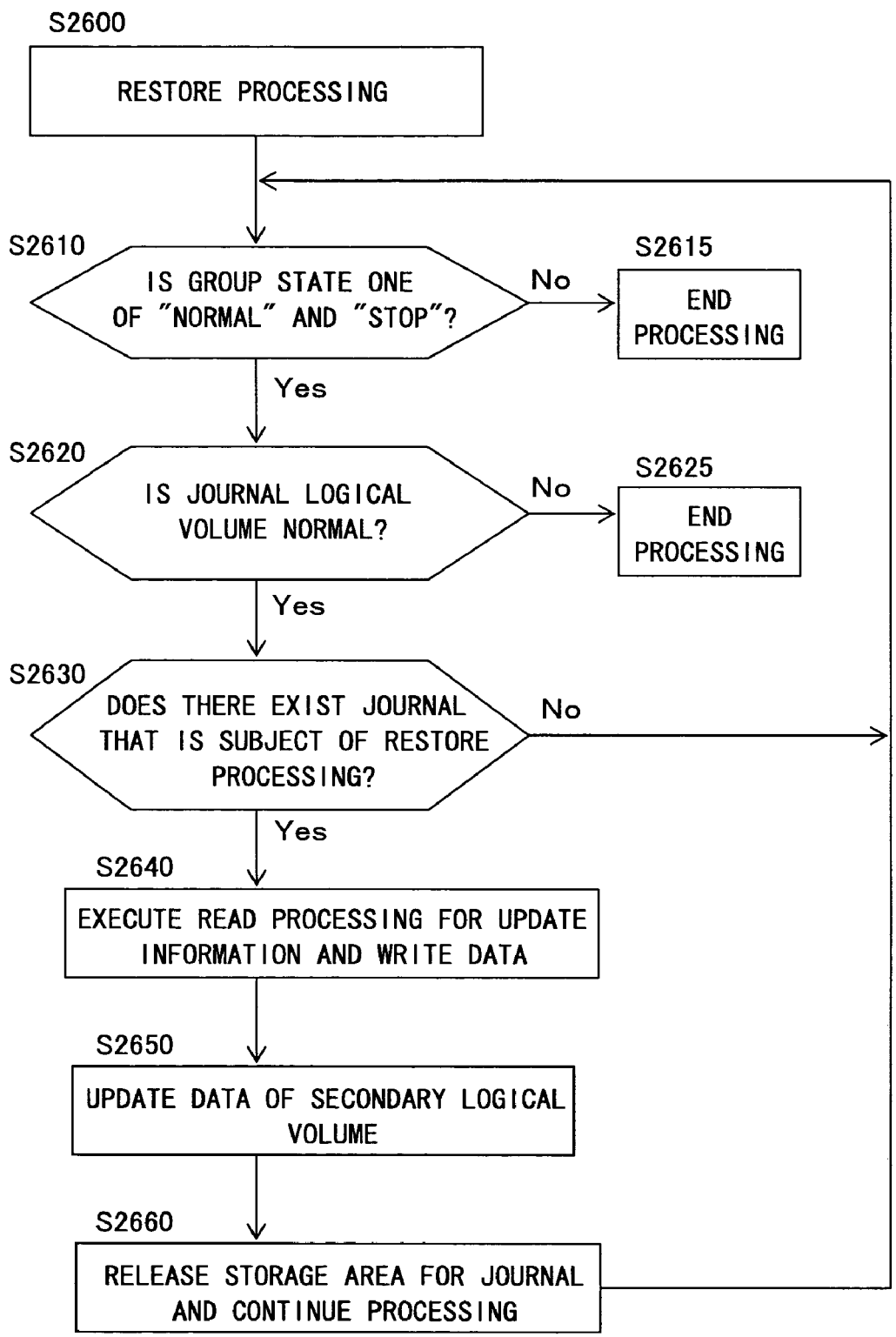
FIG. 26 is a flowchart of a restore processing according to the first embodiment of this invention.

FIG. 26 is a flowchart of the restore processing according to the first embodiment of this invention.

The restore processing is a processing executed by the restore module 250.

FIG. 26 will be referenced to describe the procedure of the restore processing in which the host adapter C of the secondary storage system C uses the journal to update data according to the following (1) to (6). It should be noted that the restore processing may be executed by the disk adapter 120 of the secondary storage system C.

(1) The host adapter C judges whether or not the group state 602 of the group whose group number is C is one of "normal" and "stop" (S2610). When the group state is judged to be neither "normal" nor "stop" in the step S2610 (for example, to be "abnormal"), the restore is impossible, so the restore processing ends (S2615).

(2) When it is judged that the group state is one of "normal" and "stop" in the step S2610, it is judged whether or not the volume state 402 of the journal logical volume 230 is normal (S2620). When it is judged that the volume state 402 of the journal logical volume 230 is "abnormal" in the step S2620, the journal logical volume 230 cannot be accessed. Therefore, the group state is changed into "abnormal", and the processing ends (S2625).

(3) When it is judged in the step S2620 that the volume state 402 of the journal logical volume 230 is "normal", it is then judged whether or not there exists the journal record that is a subject of the restore processing. To be specific, the host adapter C compares the earliest update information address 704 and latest update information address 703 of the pointer information 700. When the earliest update information address 704 and the latest update information address 703 are equal to each other, there exists no journal record that is the subject of the restore processing, so the host adapter C ends the restore processing and after a predetermined period of time, resumes the restore processing (S2630).

(4) When it is judged in the step S2630 that there exists the journal record that is the subject of the restore processing, the following processing is executed on the journal record having the earliest (smallest) update number 303. The update information 300 of the journal record having the earliest (smallest) update number 303 is stored in an area starting from a location represented by the earliest update information address 704 of the pointer information 700. The host adapter C secures a space within the cache memory 130, and instructs the disk adapter 120 to "read out information on the size of the update information 300 from the earliest update information address 704 and store the information in the cache memory 130".

According to the read/write processing, the disk adapter 120 reads out the update information 300 from the disk drive 150 to store the update information 300 in the cache memory 130, and notifies the host adapter C of read completion of the update information 300.

Upon reception of the notification of the read completion of the update information 300, the host adapter C reads out the logical address 306 of the journal logical volume storing the write data and the data size 305 of the write data from the update information 300, and secures a space within the cache memory 130. Then, the host adapter C instructs the disk adapter 120 to "read out the write data and store the write data in the cache memory 130".

According to the read/write processing, the disk adapter 120 reads out the write data from the disk drive 150 to store the write data in the cache memory 130, and notifies the host adapter C (S2640).

(5) The host adapter C references the logical address (logical address 304 of the write instruction) of the secondary logical volume 230 to be updated of the update information 300, and instructs the disk adapter 120 to "write the write data to the secondary logical volume 230" (S2650). According to the read/write processing, the disk adapter 120 writes data to the disk drive 150 corresponding to the logical address of the secondary logical volume 230, releases the cache memory 130, and notifies the host adapter C of the completion of the write processing.

(6) Upon reception of the notification of the completion of the write processing from the disk adapter 120, the host adapter C releases the storage area for the journal record. In other words, the earliest update information address 704 of the pointer information 700 is changed into a value obtained by adding thereto the size of the update information 300. When the earliest update information address 704 is equal to the write data area head address 702, the earliest update information address 704 is set to "0".

Further, the earliest write data address 706 of the pointer information 700 is changed into a value obtained by adding thereto the data size of the write data. Having reached the logical address that is not included in the capacity of the journal logical volume 230, the earliest write data address 706 is updated to a value obtained by subtracting therefrom the write data area head address 702. After that, the host adapter C starts the subsequent restore processing (S2660).

In the above-mentioned restore processing, the journal record is read out from the disk drive 150 and stored in the cache memory 130. However, when the journal exists in the cache memory 130, the above procedure is unnecessary.

In this embodiment, in the case of the journal read receiving processing and the journal read processing during the asynchronous remote copy, the primary storage system A references the pointer information 700 to designate the journal record to be sent to the secondary storage system C. However, the secondary storage system C may designate the journal record to be sent from the primary storage system A.

For example, designation of the update number is added to the journal read instruction issued from the secondary storage system C to the primary storage system A. In this case, in the journal read receiving processing for the primary storage system A, the shared memory 140 of the primary storage system A is provided therein with a table that associates an update number and a logical address for storing the update information 300, search means, or the like in order to obtain the logical address corresponding to the update information 300 on the update number designated by the secondary storage system C.

Further, in the journal read receiving processing and the journal read processing according to this embodiment, the journal read instruction is used for transferring the journal record, but a general read instruction may be used. For example, the group information 600 and pointer information 700 of the primary storage system A are transferred to the secondary storage system C in advance. Based on the above information, the secondary storage system C reads out the data (in other words, journal record) of the journal logical volume 230 of the primary storage system A in response to the read instruction.

Further, in the journal read receiving processing according to this embodiment, the secondary storage system C sends the journal records to the primary storage system A in the order of the update number, but this invention is not limited to the order of the update number. Also, the primary storage system A may send a plurality of journal read instructions to the secondary storage system C. In those cases, in order to update data by processing the journal records in the order of the update number during the restore processing for the secondary storage system C, the secondary storage system C is provided with the table that associates the update number and the logical address for storing the update information 300, the search means, or the like.

Further, in the journal read receiving processing and the journal read processing according to this embodiment, the secondary storage system C sends the journal read instruction to the primary storage system A to obtain the journal record, but the primary storage system A may send a write instruction that stores a journal record to the secondary storage system C. The write instruction that stores a journal record may be issued as a dedicated instruction journal read instruction) or as an ordinary write instruction. For example, the group information 600 and pointer information 700 of the secondary storage system C are previously transferred to the primary storage system A. Based on the above information, the primary storage system A writes the data (in other words, journal record) in the journal logical volume 230 of the secondary storage system C.

In this embodiment, the journal logical volume of the primary storage system A, the journal logical volume of the secondary storage system B, and the journal logical volume of the secondary storage system C have the same storage capacity, but may have different storage capacities.

As described above, in the computer system of this embodiment, the copy of data stored in the primary storage system A is stored in the secondary storage system B and the secondary storage system C. When updating the data to be copied, the primary storage system A issues an instruction for the update of the corresponding data within the secondary storage system B while storing the information on the update as a journal record. Upon reception of the instruction from the primary storage system A, the secondary storage system B updates the corresponding data (synchronous remote copy). The secondary storage system C obtains the journal record from the primary storage system A, and uses the obtained journal record to update the corresponding data according to the data update order of the primary storage system A (asynchronous remote copy). As a result, the secondary storage system B and the secondary storage system C maintain the data consistency while holding the copy of the data of the primary storage system A.

<Bitmap (BM) Difference Formation>

Next, according to the first embodiment of this invention, description will be made of a procedure for a failover carried out when a failure occurs in the host computer A.

During normal operation, the storage system A and the storage system B form a pair based on the synchronous remote copy. In other words, the data stored in the storage system B is the same as that stored in the storage system A because of the synchronous remote copy. Therefore, when a failure occurs in the host computer A, the host computer B can use the storage system B to take over the task of the host computer A.

On the other hand, during normal operation, the storage system A and the storage system C form a pair based on the asynchronous remote copy. Therefore, in the case where the host computer B or the storage system B cannot be used when a failure occurs in the host computer A, a host computer (not shown) connected to the storage system C can use the storage system C to take over the task of the host computer A.

However, the storage system B and the storage system C form no pair during normal operation. In other words, the data consistency cannot be guaranteed between the storage system B and the storage system C. Accordingly, after the host computer B takes over the operation of the host computer A and when a failure occurs in the host computer B or the storage system B, the host computer connected to the storage system C cannot take over the task of the host computer B by use of the storage system C.

Therefore, after the host computer B takes over the operation of the host computer A, the storage system B and the storage system C form a new pair. In other words, the data consistency can be maintained. After that, when a failure occurs in the host computer B or the storage system B, the host computer connected to the storage system C can take over the task of the host computer B. Thus, the system improves in failure resistance.

In this invention, upon formation of the new pair between the storage system B and the storage system C, among data stored in the storage system B, only data that is not stored in the storage system C (in other words, difference data) is transferred and copied to the storage system C. Hereinafter, such pair formation by thus copying only the difference data will be referred to as "difference formation".

In this embodiment, a difference bitmap (BM) is referenced to perform the difference formation. Hereinafter, this will be referred to as "bitmap difference formation".

The difference bitmap is a set of flags indicating areas within the logical volume 230 in which data has been updated (written). For example, a bit is allocated to each logical block (sector) composing the logical volume 230. When the state of pair to which the logical volume 230 concerned belongs is "suspend", the update of the data of the logical volume 230 is not reflected on the logical volume of the other of the pair. In this state, when the logical block within the logical volume 230 is updated, the value of the bit allocated to the logical block changes from "0" into "1". It should be noted that the bit of the difference bitmap can be allocated to an area having an arbitrary size. For example, a bit may be allocated to each plurality of logical blocks (each track or the like). In that case, when any piece of the data included in the area allocated to a bit is updated, the value of the bit changes from "0" into "1".

Alternatively, when the data is updated, the value of the bit may change from "1" into "0".

Provided to each logical volume 230 are difference bitmaps whose number is the same as the number of pairs to which the logical volume 230 belongs. For example, the logical volume DATA1 of the storage system A of FIG. 1 forms a pair with the logical volume data1 of the storage system B and a pair with the logical volume COPY1 of the storage system C. Therefore, the DATA1 includes a difference bitmap corresponding to the pair with the data1 and a difference bitmap corresponding to the pair with the Copy1.

The difference bitmap is stored within the shared memory 140. The difference BM location 509 of the pair information 500 is a location (address) at which each difference bitmap is stored. The difference bitmap may be stored in the cache memory 130 or another memory.

Figure 27:
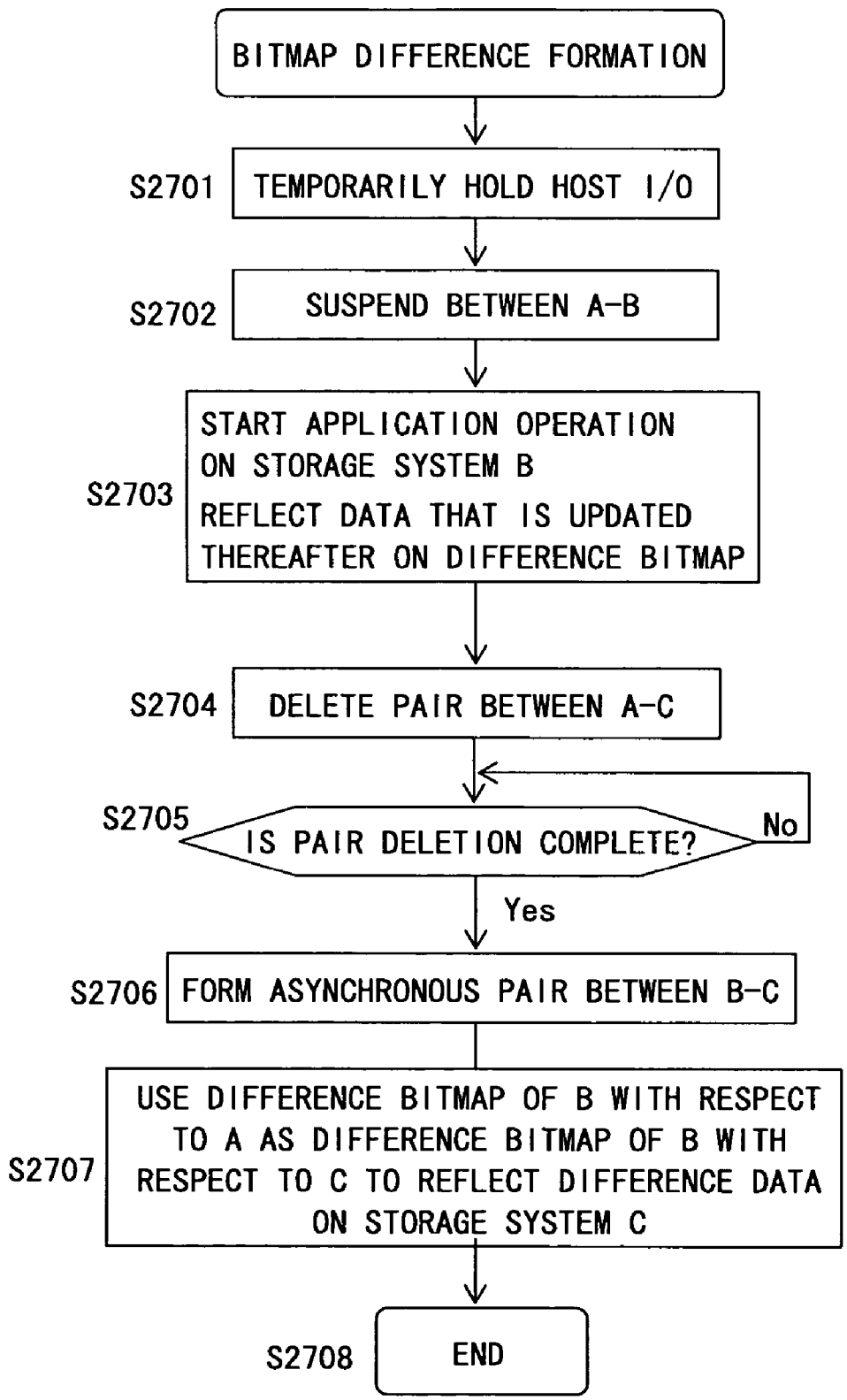
FIG. 27 is a flowchart of bitmap difference formation according to the first embodiment of this invention.
Figure 28:
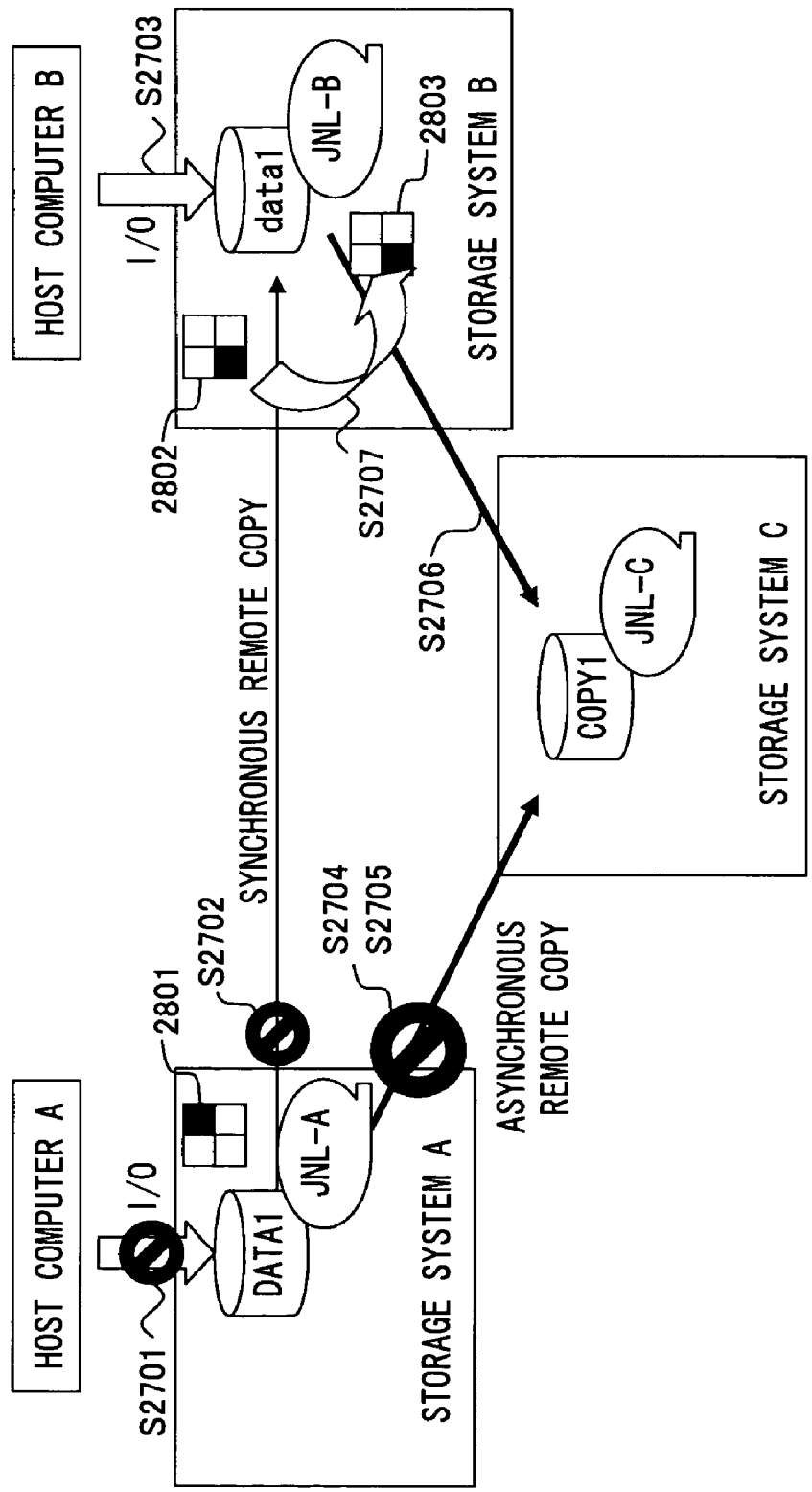
FIG. 28 is an explanatory diagram of the bitmap difference formation according to the first embodiment of this invention.

Next, FIGS. 27 and 28 will be referenced to describe a procedure for the bitmap difference formation.

It should be noted that the execution of the bitmap difference formation is premised on the normal operation of the storage system A. Therefore, the following description of the bitmap difference formation assumes that a failure or the like has occurred in the host computer A, and the storage system A is operating normally.

FIG. 27 is a flowchart of the bitmap difference formation according to the first embodiment of this invention. FIG. 28 is an explanatory diagram of the bitmap difference formation according to the first embodiment of this invention.

FIG. 28 shows an example of the pair of the logical volumes DATA1 and data1 and the pair of the logical volumes DATA1 and COPY1. Also, steps S2701 to S2707 of FIG. 28 correspond to the step numbers of the flowchart of FIG. 27.

It should be noted that each step of the flowchart of FIG. 27 is executed by the difference formation module B or the like of the storage system B in response to the instruction of the difference formation instructing module B of the host computer B.

When the bitmap difference formation starts due to the failure or the like of the host computer A, the difference formation instructing module 260 (hereinafter, referred to as "difference formation instructing module B") of the host computer B instructs the difference formation module 265 (hereinafter, referred to as "difference formation module B") of the storage system B to temporarily hold host I/O of the storage system A (S2701). In response thereto, the difference formation module B instructs the storage system A to temporarily hold host I/O. As a result, the procedure stops the write and read of data from the host computer A to the storage system A. In other words, the data of the storage system A is not updated by the host computer A.

Next, the difference formation instructing module B instructs the difference formation module B to suspend the pair of the storage systems A and B (in other words, pair of DATA1 and data1) (S2702). As a result, the pair continues, but the data transfer by the synchronous remote copy stops in the pair. At the time of the suspend, the same data are stored in DATA1 and data1. Further, all bits are set to "0" in a difference bitmap 2801 of DATA1 with respect to data1 and a difference bitmap 2802 of data1 with respect to DATA1. At this time, a pair is not formed yet between data1 and COPY1, so a difference bitmap 2803 of data1 with respect to COPY1 does not exist yet.

Next, the host computer B uses the storage system B to start application operation (S2703). In other words, the host computer B uses the storage system B to take over the task of the host computer A. After that, the data of data1 within the storage system B is updated by the host computer B. At this time, the value of the bit within the difference bitmap 2802 corresponding to the updated data is changed from "0" into "1".

Next, the difference formation instructing module B instructs the storage system C to delete the pair between the storage systems A and C (S2704). Upon reception of the pair deleting instruction, the journal read module 240 of the storage system C requests the storage system A to transfer a journal record stored in the journal logical volume JNL-A. Then, the journal record transferred from the storage system A is stored in the journal logical volume JNL-C of the storage system C. All the journal records that are stored in the JNL-A when the pair deleting instruction is issued are transferred to JNL-C, and when all the journal records that are transferred to JNL-C are restored, the pair deletion ends. The journal records stored in JNL-C are reflected on COPY1 by the restore module 250 of the storage system C.

The difference formation instructing module B judges whether or not the pair deletion has ended (S2705). To be specific, when all the journals stored in JNL-A when the pair deleting instruction (S2704) is issued have been transferred to JNL-C in the step S2705, it is judged that the pair deletion has ended. When the pair deletion has not ended, the pair deletion continues, and it is judged again whether or not the pair deletion has ended (S2705).

When it is judged in the step S2705 that the pair deletion has ended, the difference formation instructing module B instructs the difference formation module B to form a pair between the storage systems B and C for the asynchronous remote copy (S2706). In other words, the pair is formed between data1 and COPY1. At this time, the difference formation module B creates the difference bitmap 2803 of data1 with respect to COPY1 within the shared memory 140.

Next, the storage system B uses the difference bitmap with respect to the storage system A as the difference bitmap with respect to the storage system C to reflect the difference data on the storage system C (S2707). To be specific, the value of each bit of the difference bitmap 2802 of data1 with respect to DATA1 is copied to the difference bitmap 2803. Then, among data included in the logical volume data1, the difference formation module B transfers, to the logical volume COPY1 of the storage system C, the data where the corresponding bit in the difference bitmap 2803 has a value of "1" (in other words, difference data that is updated by the host computer B after the suspend of the step S2702), and updates COPY1. As a result, the update of the data of the storage system B which is performed by the host computer B after the suspend (S2702) is reflected on the storage system C.

The bitmap difference formation ends after the above-mentioned steps (S2708). After that, the storage systems B and C are operated as the pair by the asynchronous remote copy. When abnormality occurs in any of the steps S2701 to S2706, the bitmap difference formation is unsuccessful. In this case, all the data of the logical volume data1 of the storage system B are transferred and copied to the logical volume COPY1 of the storage system C, thereby forming a pair between the storage systems B and C.

In general, in order to form the pair between the storage systems B and C after the state of the pair of the storage systems A and B is set to suspend, all the data of the logical volume 230 need be copied from the storage system B to the storage system C. This copy processing usually takes a long period of time.

However, according to the above-mentioned bitmap difference formation, the difference bitmap is referenced to copy only the updated pieces of data, thereby forming the pair between the storage systems B and C. Thus, the time required for forming the pair can be reduced.

It should be noted that in FIG. 27, the temporarily holding of the host I/O (S2701) may be executed by using the suspend of the pair of the storage systems A and B (S2702) as a trigger. For example, upon reception of the instruction for suspend from the storage system B, the storage system A holds the host I/O before executing the suspend. As a result, the step S2701 can be omitted.

Further, in FIG. 27, in any of the steps S2701 and S2702, the temporarily holding of the host I/O can be omitted. However, in this case, the storage system A is liable to receive an undesirable update (for example, write of meaningless data) from the host computer A in which a failure has occurred. Such update, which is executed before the pair of the storage systems A and C have been deleted (S2705), is reflected on the storage system C. Thus, the undesirable update for the storage system C need be deleted.

Therefore, when the data within DATA1 of the storage system A is updated by the host computer A after the suspend (S2702), the value of the bit in the difference bitmap 2801 corresponding to the data is set to "1". Then, in the step S2706, the difference bitmap 2801 and the difference bitmap 2802 are merged to be copied to the difference bitmap 2803. In other words, when at least one of the bit of the difference bitmap 2801 and the bit of the corresponding difference bitmap 2802 has a value of "1" (in other words, is updated), the bit of the difference bitmap 2803 corresponding to those bits is set to "1".

To be specific, logical sums of the bits in the difference bitmap 2801 and the bits in the difference bitmap 2802 may be calculated to copy the resultant value to the difference bitmap 2803. Alternatively, after the values of the bits in the difference bitmap 2802 are copied to the difference bitmap 2803, the logical sums of the bits in the difference bitmap 2801 and the bits in the difference bitmap 2802 may be calculated to set the resultant value as a new difference bitmap 2803.

It should be noted that in each difference bitmap, when the bit indicating that the data has been updated has a value of "0", a logical product is calculated instead of calculating the logical sum.

After that, among data included in the logical volume data1, the difference formation module B transfers, to the logical volume COPY1 of the storage system C, the data where the corresponding bit in the difference bitmap 2803 has a value of "1". As a result, the data in an area indicated by the difference bitmap 2801 and the data in an area indicated by the difference bitmap 2802 are transferred from data1 to COPY1, and COPY1 is updated based on the transferred data.

Accordingly, for example, even when meaningless data is written from the host computer A to the storage system A and the data is also written to the storage system C, the original data can be recovered thereafter by writing the data of the storage system B.

<Journal Difference Formation>

Next, description will be made of a second embodiment of this invention. The structures and configurations shown in FIGS. 1 to 26 according to the first embodiment of this invention are also applied to the second embodiment of this invention. Thus, description will be omitted of those structures and configurations.

The second embodiment of this invention differs from the first embodiment of this invention which uses a difference bitmap (bitmap difference formation) in that a journal is used for the difference formation when a pair is formed between the storage system B and the storage system C. Such difference formation using a journal will be referred to as "journal difference formation" hereinafter.

It should be noted that the journal difference formation differs from the bitmap difference formation, and can be executed even when a failure occurs in either of the host computer A and the storage system A.

Hereinafter, FIGS. 29 and 30 will be referenced to describe the journal difference formation.

Figure 29:
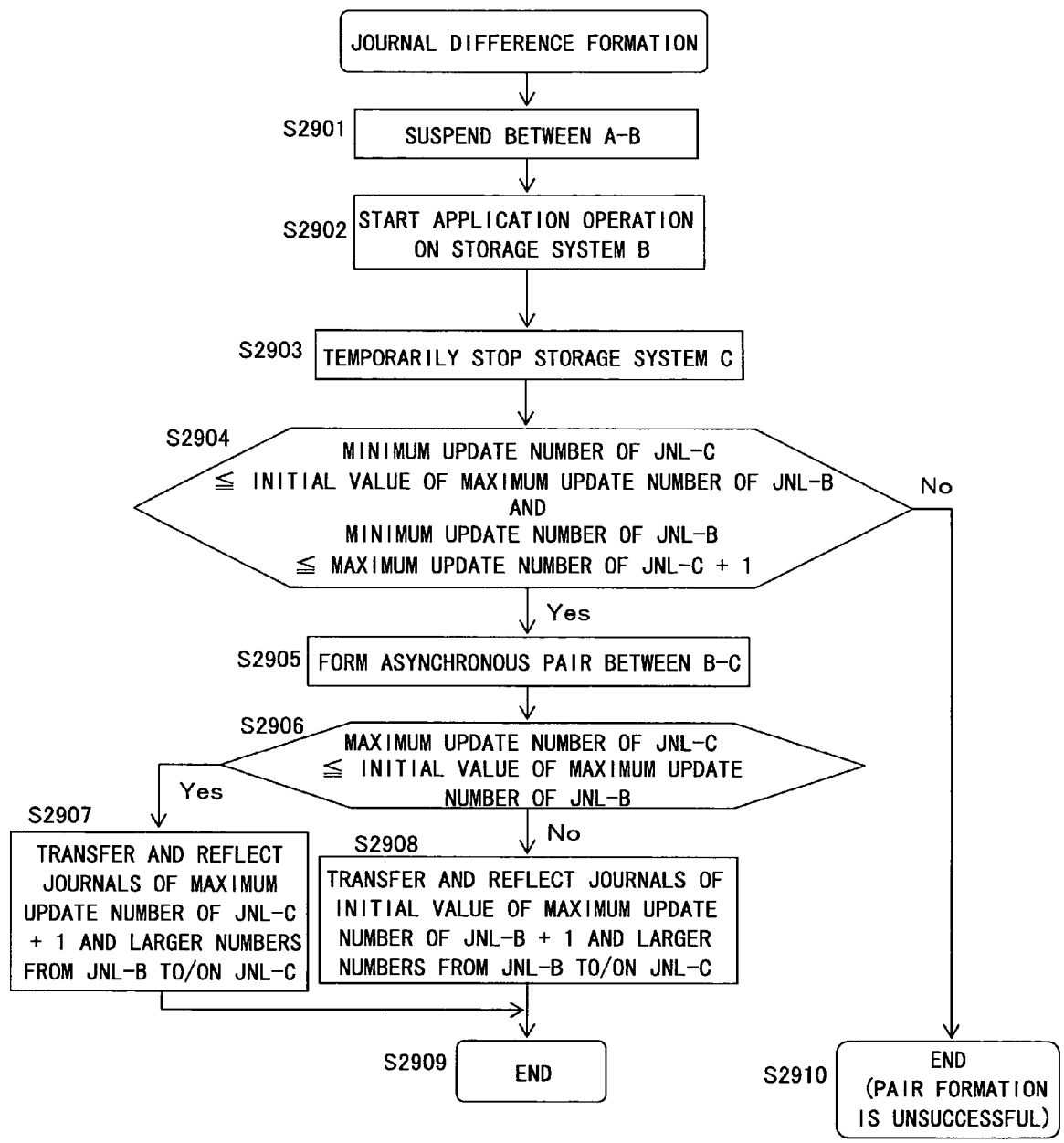
FIG. 29 is a flowchart of journal difference formation according to a second embodiment of this invention.

FIG. 29 is a flowchart of the journal difference formation according to the second embodiment of this invention. FIG. 30 is an explanatory diagram of the journal difference formation according to the second embodiment of this invention.

The description of portions shared with the bitmap difference formation will be omitted from the description of those drawings. In FIG. 30, the step numbers such as S2901 correspond to the step numbers of the flowchart of FIG. 29.

First, description will be made of an operation according to this embodiment during normal operation (in other words, when there has occurred no failure).

Having had the data updated in response to the write instruction from the host computer A, the storage system A reflects the update on the storage system B by the synchronous remote copy. Further, in order to reflect the update on the storage system C by the asynchronous remote copy, the journal record relating to the data is created to be stored in the journal logical volume 230 (JNL-A). In addition, the storage system A transfers the update number 303 of the journal record thus created to the storage system B by the synchronous remote copy along with the data.

The storage system B creates the journal record based on the transferred data and update number 303 and stores the journal record in the journal logical volume 230 (JNL-B).

The storage system A transfers the journal record stored in the journal logical volume JNL-A to the storage system C, and then erases the journal record.

However, the storage system B uses no journal during normal operation. Therefore, when there is no free capacity left in the journal logical volume JNL-B, the journal records are erased in the order from the earliest one (in other words, journal record whose update number 303 is small) and a new journal record is stored.

Next, description will be made of the journal difference formation in the case where a failure occurs in the host computer A or the storage system A.

It should be noted that each step of the flowchart of FIG. 29 is executed by the difference formation module B or the like of the storage system B in response to the instruction of the difference formation instructing module B of the host computer B.

When the journal difference formation starts, the difference formation instructing module B of the host computer B instructs the difference formation module B of the storage system B to suspend the pair of the storage systems A and B (S2901).

Next, the difference formation instructing module B instructs the host computer B to start the application operation (S2902). After that, the host computer B uses the storage system B to operate applications. Accordingly, the task of the host computer A is taken over to the host computer B.

Having had the data updated by the host computer B, the storage system B creates a journal record relating to the update, and stores the journal record in the journal logical volume JNL-B. At this time, the journal record is provided with an update number 303 that follows the update number 303 of the journal record stored last in JNL-B before the pair of the storage systems A and B is suspended (hereinafter, referred to as "initial value of maximum update number").

When there is no free capacity left for storing a new journal record in JNL-B, the journal records are erased in the order from the earliest one (in other words, journal record whose update number is smallest), and the new journal record is stored.

Figure 30:
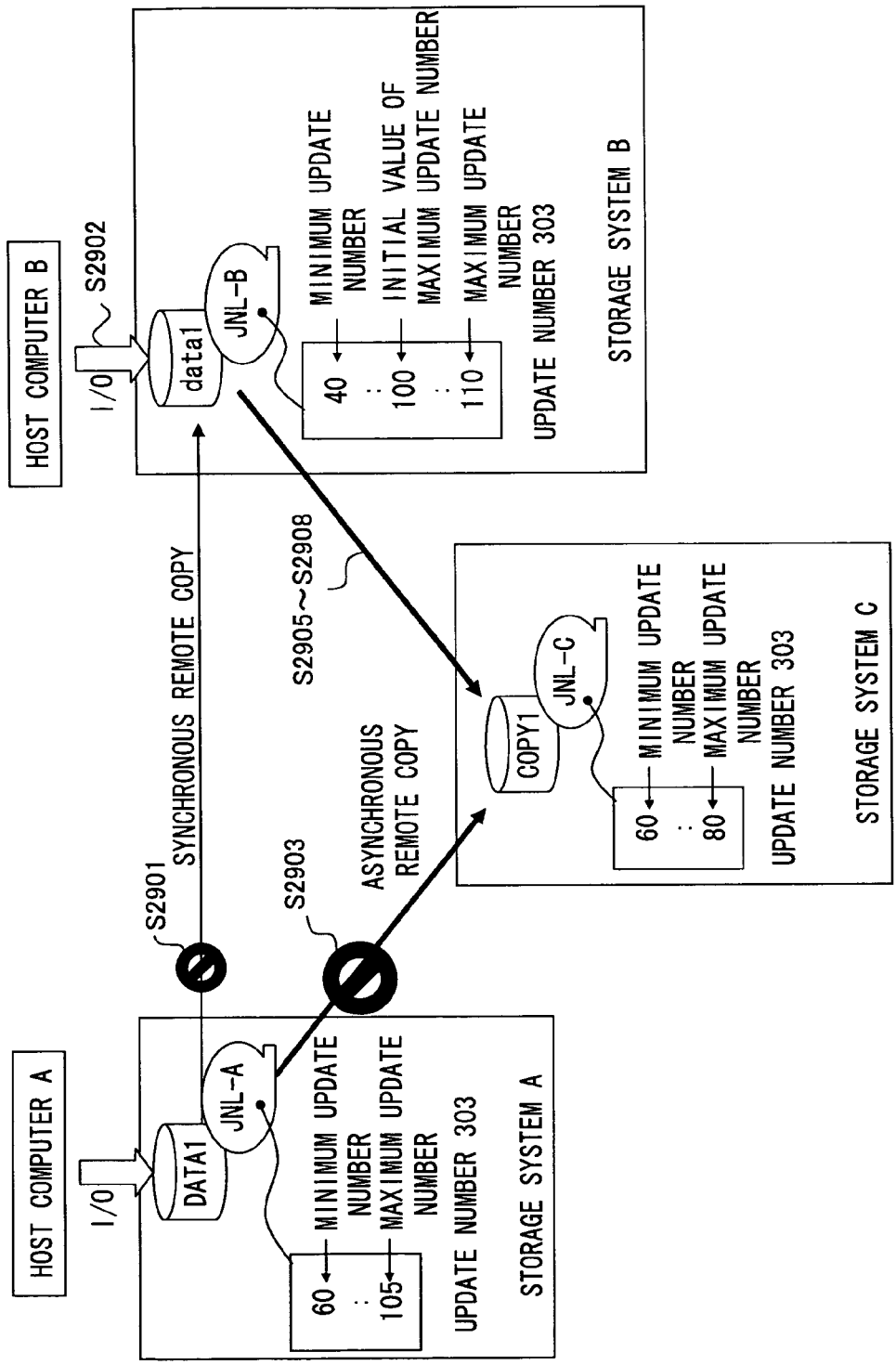
FIG. 30 is an explanatory diagram of the journal difference formation according to the second embodiment of this invention.

In the example of FIG. 30, at the time of the suspend (S2901), JNL-B stores journal records whose update numbers are "40" to "100". In other words, the update numbers "40" to "100" have been transferred from the storage system A to the storage system B. Thus, the initial value of maximum update number is "100".

After that, when the operation of the host computer B starts and then the host computer B updates the data of the storage system B, the storage system B creates the journal record relating to the update, and stores the journal record in JNL-B. At this time, the storage system B assigns the update number of "101" and the subsequent update numbers to the new journal records in the data update order. At the instance shown in FIG. 30, 10 journal records are created in the storage system B after the suspend (S2901), and the maximum update number 303 is "110". At this time, there is the journal record whose update number 303 is "40" left unerased, so the minimum update number 303 is "40".

It should be noted that the procedure of creating a journal in the storage system B is the same as the journal creating processing as shown in FIG. 19.

Next, the difference formation instructing module B instructs the difference formation module B to temporarily stop the storage system C (S2903). The difference formation module B instructs the difference formation module 265 of the storage system C to temporarily stop the storage system C. After that, the storage system A keeps creating journal records, but the storage system C no longer receives the journal records from the storage system A. The storage system C keeps holding the journal records stored in JNL-C, but temporarily stops the restore processing that reflects the journal records on the logical volume.

In the example of FIG. 30, the journal logical volume JNL-C of the storage system C stores journal records whose update numbers 303 are "60" to "80". In other words, the minimum update number 303 of JNL-C is "60", and the maximum update number 303 is "80".

It should be noted that the storage systems A and C form a pair based on the asynchronous remote copy. Thus, the storage system C does not always receive the journal records in the order of the update numbers 303. Accordingly, depending on the conditions where a failure has occurred, there may be a dropout in the journal records stored in JNL-C (in other words, the update numbers 303 are not successive). In this case, the maximum value within the range of the successive update numbers 303 is set as the maximum value of the update number 303 of JNL-C (in other words, maximum update number 303).

For example, in FIG. 30, the maximum update number 303 is "80" in the case where JNL-C stores the journal records whose update numbers 303 are "60" to "80" successively, does not store a journal record whose update number 303 is "81", and further stores the journal record whose update number 303 is "82".

On the other hand, the journal logical volume JNL-A of the storage system A stores journal records whose update numbers 303 are "60" to "105". In other words, the minimum update number 303 of JNL-A is "60", and the maximum update number 303 is "105". Of those journal records, the journal records whose update numbers 303 are "60" to "80" have already been transferred from the storage system A to the storage system C. The journal records whose update numbers 303 are "101" to "105" have been created after the suspend (S2901), so the meaningless data written from the host computer A that has experienced a failure may be included.

Next, the difference formation module B judges whether or not the minimum update number 303 of the journal logical volume JLN-C is equal to or smaller than the initial value of maximum update number of the journal logical volume JLN-B, and the minimum update number 303 of JLN-B is equal to or smaller than a value obtained by adding "1" to the maximum update number 303 of JNL-C (S2904).

When the judgment result of the step S2904 is "No" (in other words, when the minimum update number 303 of the journal logical volume JLN-C is larger than the initial value of maximum update number of the journal logical volume JLN-B, or the minimum update number 303 of JLN-B is larger than the value obtained by adding "1" to the maximum update number 303 of JNL-C), there is a shortage of at least one journal record necessary for the journal difference formation, so the journal difference formation is unsuccessful, which ends the processing (S2910). In this case, all the data of the logical volume data1 of the storage system B are transferred to and stored in the logical volume COPY1 of the storage system C, thereby forming the pair between the storage systems B and C.

On the other hand, when the judgment result of the step S2904 is "Yes", journal records necessary for the journal difference formation are all provided. Thus, the difference formation instructing module B instructs the difference formation module B to form the pair between the storage systems B and C by the asynchronous remote copy (S2905).

In the example of FIG. 30, the minimum update number 303 of JNL-C is "60", which is equal to or less than "100" being the initial value of maximum update number of JNL-B. Also, the minimum update number 303 of JNL-B is "40", which is equal to or less than the value "81" obtained by adding "1" to the maximum update number 303 of JNL-C. Therefore, the judgment result of the step S2904 is "Yes".

If the minimum update number 303 of JNL-B is "90", the minimum update number 303 is larger than the value "81" obtained by adding "1" to the maximum update number 303 of JNL-C. At this time, the journal records whose update numbers 303 are "81" to "89" exist in neither JNL-B nor JNL-C, so those journal records cannot be used to form pairs. Therefore, the pair formation is unsuccessful, which ends the processing (S2910).

Next, the difference formation module B judges whether or not the maximum update number 303 of JNL-C is equal to or smaller than the initial value of maximum update number of JNL-B (S2906).

When the judgment result of the step S2906 is "Yes", from among the journal records of JNL-B, a journal record whose update number 303 is equal to or larger than the value obtained by adding "1" to the maximum update number 303 of JNL-C is transferred to and stored in JNL-C. Then, the storage system C uses the restore processing to reflect the content of JNL-C on COPY1. To be specific, the data of the journal records stored in JNL-C are stored in COPY1 in the order of the update numbers 303 (S2907).

On the other hand, when the judgment result of the step S2906 is "No", from among the journal records of JNL-B, a journal record whose update number 303 is equal to or larger than a value obtained by adding "1" to the initial value of maximum update number of JNL-B is transferred to and stored in JNL-C. Then, the storage system C uses the restore processing to reflect the content of JNL-C on COPY1. To be specific, the data of the journal records stored in JNL-C are stored in COPY1 in the order of the update numbers 303 (S2908).

As a result of the steps S2907 and S2908, the data updated by the host computer A and the data updated by the host computer B are reflected on (written to) the storage system C according to the updated order.

In the example of FIG. 30, the update number 303 of JNL-C is "80", which is equal to or less than "100" being the initial value of maximum update number of JNL-B. Therefore, the judgment result of the step S2906 is "Yes". Accordingly, the journal records whose update numbers 303 are equal to or larger than "81" are transferred from JNL-B to JNL-C and stored in JNL-C (S2907).

If the initial value of minimum update number of JNL-B is "70", the maximum update number 303 of JNL-C is "80", so the judgment result of the step S2906 is "No". Accordingly, the journal records whose update numbers 303 are equal to or larger than "71" are transferred from JNL-B to JNL-C and stored in JNL-C (S2908).

In this case, before the step 2908 is executed, the journal records whose update numbers 303 stored in JNL-C are "71" to "80" include the data updated by the host computer A after the suspend (S2901). In other words, those journal records may include the meaningless data. However, in the step S2908, those journal records are replaced by the journal records stored in JNL-B, thereby preventing the meaningless data to be written to COPY 1.

The journal difference formation ends after the above-mentioned steps (S2909). After that, the storage systems B and C are operated as the pair by the asynchronous remote copy. When abnormality occurs in any of the steps S2901 to S2908, the journal difference formation is unsuccessful. In this case, similarly to the step S2910, all the data of the logical volume data1 are copied, thereby forming the pair between the storage systems B and C.

According to the above-mentioned journal difference formation, immediately after the state of the pair of the storage systems B and C is set to suspend, the operation of the host computer can be started, which reduces the time during which the system stops.

Further, according to the journal difference formation, only the updated data is copied to form the pair between the storage systems B and C, so the time required for forming the pair can be reduced.

Furthermore, according to the journal difference formation, the difference formation is executed in the data update order, so the data consistency can be maintained even when the difference formation is interrupted.

<Journal+Bitmap Difference Formation>

Next, description will be made of a third embodiment of this invention. The structures and configurations shown in FIGS. 1 to 26 according to the first and second embodiments of this invention are also applied to the third embodiment of this invention. Thus, description will be omitted of those structures and configurations.

The third embodiment of this invention differs from either of the first and second embodiments of this invention in that a journal is used for the difference formation when a pair is formed between the storage system B and the storage system C, and that when there is a shortage of a journal record, a difference bitmap is used to compensate the shortage for the difference formation. Such difference formation using a journal and a difference bitmap will be referred to as "journal BM difference formation" hereinafter.

It should be noted that similarly to the journal difference formation, the journal BM difference formation can be executed even when a failure occurs in either of the host computer A and the storage system A.

Hereinafter, FIGS. 31 and 32 will be referenced to describe the journal BM difference formation.

Figure 31:
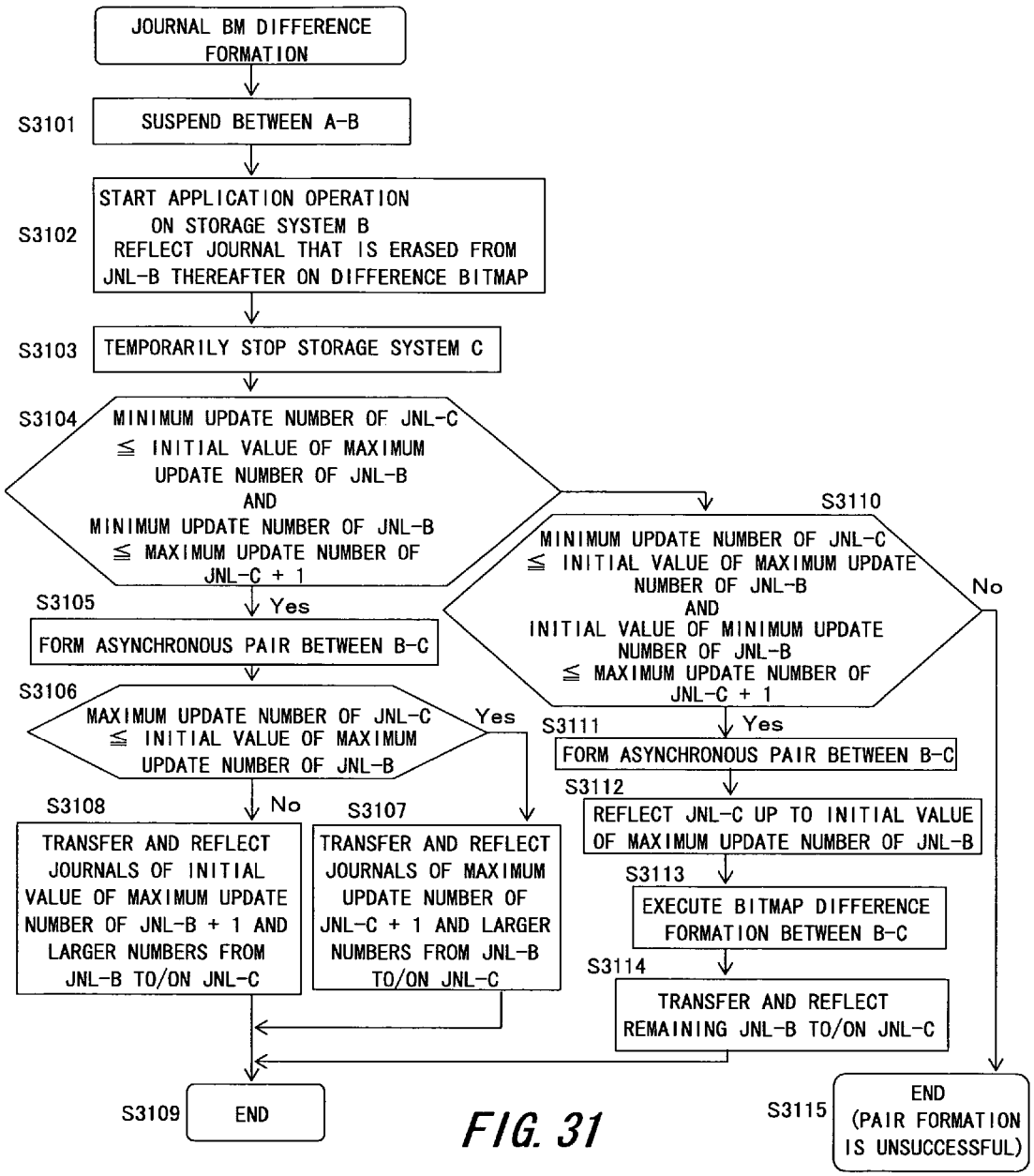
FIG. 31 is a flowchart of journal BM difference formation according to a third embodiment of this invention.

FIG. 31 is a flowchart of the journal BM difference formation according to the third embodiment of this invention. FIG. 32 is an explanatory diagram of the journal BM difference formation according to the third embodiment of this invention.

Figure 32:
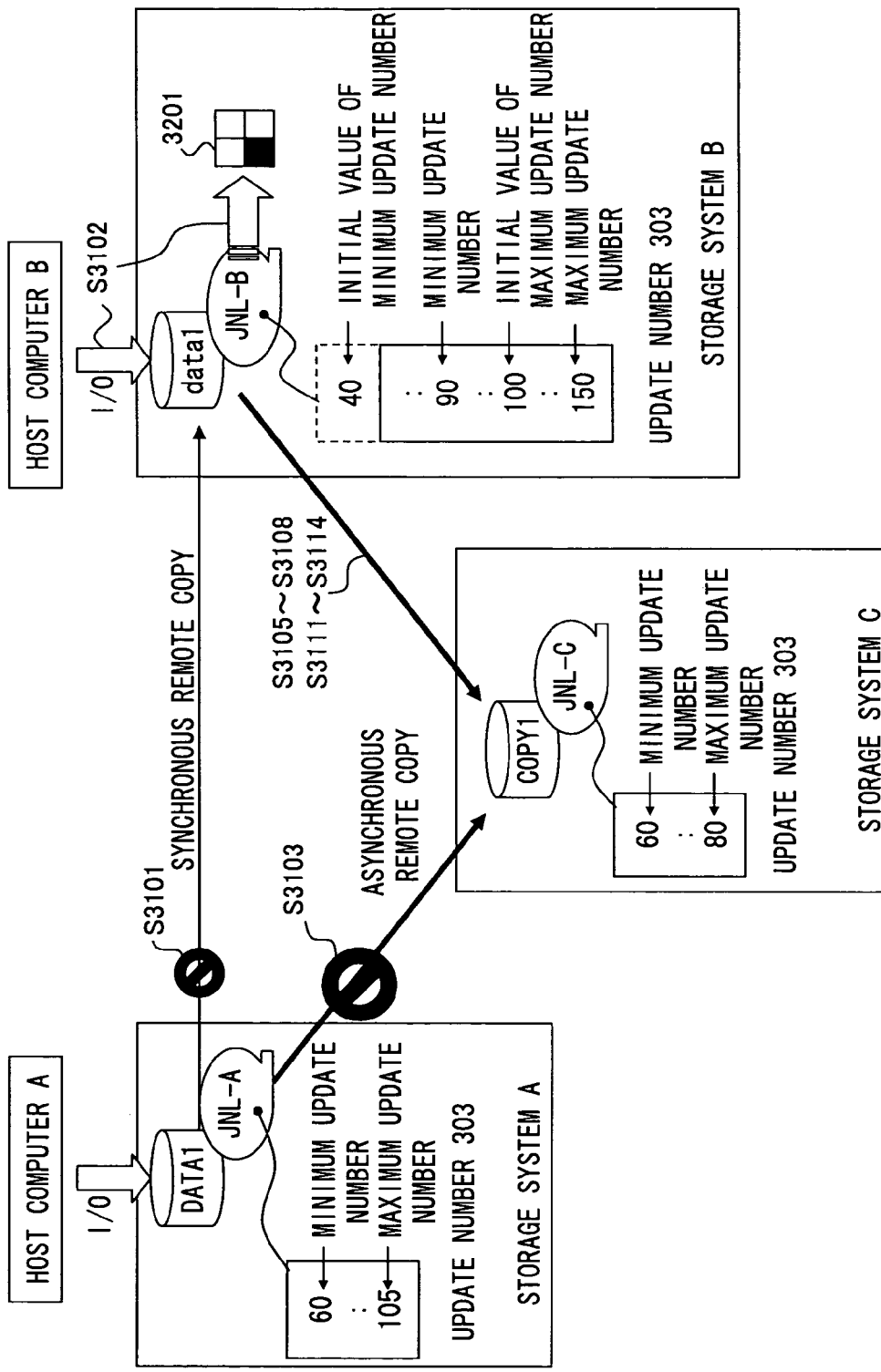
FIG. 32 is an explanatory diagram of the journal BM difference formation according to the third embodiment of this invention.

The description of portions in FIG. 32 shared with FIG. 28 or 30 will be omitted. In FIG. 32, the step numbers such as S3101 correspond to the step numbers of the flowchart of FIG. 31.

The operation according to this embodiment during normal operation (in other words, when there has occurred no failure) is the same as that according to the second embodiment, so its description will be omitted.

It should be noted that each step of the flowchart of FIG. 31 is executed by the difference formation module B or the like of the storage system B in response to the instruction of the difference formation instructing module B of the host computer B.

When a failure occurs in the host computer A or the storage system A and the journal BM difference formation starts, the difference formation instructing module B of the host computer B instructs the difference formation module B of the storage system B to suspend the pair of the storage systems A and B (S3101).

Next, the difference formation instructing module B instructs the host computer B to start the application operation (S3102). After that, the host computer B uses the storage system B to operate applications. Accordingly, the task of the host computer A is taken over to the host computer B.

Having had the data updated by the host computer B, the storage system B creates a journal record relating to the update, and stores the journal record in the journal logical volume JNL-B. At this time, the journal record is provided with an update number 303 that follows the update number 303 of the journal record stored last in JNL-B before the pair of the storage systems A and B is suspended (hereinafter, referred to as "initial value of maximum update number").

When there is no free capacity left for storing a new journal record in JNL-B, the journal records are erased in the order from the earliest one (in other words, journal record whose update number is smallest) and the new journal record is stored. At this time, the journal record to be erased is reflected on a difference bitmap 3201. To be specific, "1" is set as the value of a bit corresponding to the data included in the journal record to be erased from among the bits of the difference bitmap 3201. In other words, the difference bitmap 3201 indicates areas where the data of journal records erased from JNL-B is stored.

It should be noted that the minimum value of the update numbers 303 of the journal records stored in JNL-B at the time of the suspend (S3101) is set as an "initial value of minimum update number".

In the example of FIG. 32, at the time of the suspend (S3101), JNL-B stores journal records whose update numbers are "40" to "100". In other words, the update numbers "40" to "100" have been transferred from the storage system A to the storage system B. Thus, the initial value of minimum update number is "40", and the initial value of maximum update number is "100".

After that, when the operation of the host computer B starts and then the host computer B updates the data of the storage system B, the storage system B stores the journal record relating to the update in JNL-B. At this time, the storage system B assigns the update number of "101" and the subsequent update numbers to the new journal records in the data update order. At the instance shown in FIG. 30, 50 journal records are created in the storage system B after the suspend (S3101), and the maximum update number 303 is "150". At this time, the journal records whose update numbers 303 are "40" to "89" have been erased for storing new journal records. Therefore, the minimum update number 303 is "90".

Unlike the above description, the update of the data performed by the storage system B is not directly reflected on the difference bitmap 3201. Instead, the data of the journal records to be erased from JNL-B (in the example of FIG. 32, journal records whose update numbers 303 are "40" to "89") are reflected. Otherwise, the difference bitmap 3201 is the same as the difference bitmap 2802 shown in FIG. 28.

Among the subsequent steps, the steps S3103 to S3109 are the same as the steps S2903 to S2909 shown in FIG. 29, respectively, so their description will be omitted.

When the judgment result of the step S3104 is "No" (in other words, when the minimum update number 303 of the journal logical volume JLN-C is larger than the initial value of maximum update number of the journal logical volume JLN-B, or the minimum update number 303 of JLN-B is larger than the value obtained by adding "1" to the maximum update number 303 of JNL-C), there is a shortage of at least one journal record necessary for the journal difference formation. In this case, in this embodiment, it is judged whether or not the shortage of the journal record can be compensated by the difference bitmap 3201. To be specific, it is judged whether or not the minimum update number 303 of JNL-C is equal to or smaller than the initial value of maximum update number of JNL-B, and the initial value of minimum update number of JNL-B is equal to or smaller than a value obtained by adding "1" to the maximum update number 303 of JNL-C (S3110).

When the judgment result of the step S3110 is "No", the data of at least one of the lacking journal records have not been reflected on the difference bitmap 3201. In other words, the shortage of the journal records cannot be compensated by the difference bitmap 3201, so the journal BM difference formation is unsuccessful, which ends the processing (S3115). In this case, all the data of the logical volume data1 of the storage system B are transferred and copied to the logical volume COPY1 of the storage system C, thereby forming the pair between the storage systems B and C.

On the other hand, when the judgment result of the step S3110 is "Yes", the data of all the lacking journal records have been reflected on the difference bitmap 3201. In other words, the shortage of the journal records can be compensated by the difference bitmap 3201. Therefore, the difference formation instructing module B instructs the difference formation module B to form the pair between the storage systems B and C by the asynchronous remote copy (S3111).

In the example of FIG. 32, the minimum update number 303 of JNL-C is "60", which is equal to or less than "100" being the initial value of maximum update number of JNL-B. However, the minimum update number 303 of JNL-B is "90", which is not equal to or less than the value "81" obtained by adding "1" to the maximum update number 303 of JNL-C. Therefore, the judgment result of the step S3104 is "No".

On the other hand, the initial value of minimum update number of JNL-B is "40", which is equal to or smaller than the value "81" obtained by adding "1" to the maximum update number 303 of JNL-C. Therefore, the judgment result of the step S3110 is "Yes".

If the initial value of minimum update number of JNL-B is "85", the minimum update number 303 is larger than the value "81" obtained by adding "1" to the maximum update number 303 of JNL-C. At this time, the journal records whose update numbers 303 are "81" to "84" exist in neither JNL-B nor JNL-C. In addition, the data of those journal records have not been reflected on the difference bitmap 3201. Therefore, the difference bitmap 3201 cannot compensate the shortage of the journal records. Accordingly, the journal BM difference formation is unsuccessful, which ends the processing (S3115).

Next, of the journal records stored in JNL-C, the journal records whose update numbers 303 are smaller than the initial value of minimum update number of JNL-B are reflected on the logical volume COPY1 by the restore processing (S3112). This is executed when the difference formation instructing module B issues the instruction for the restore processing. At this time, of the journal records stored in JNL-C, the journal records whose update numbers 303 are equal to or larger than the initial value of minimum update number of JNL-B are not reflected on the logical volume COPY1 and discarded.

By the restore processing of the step S3112, the data of the journal records stored in JNL-C are stored in COPY1 in the order of update number 303.

In the example of FIG. 32, the initial value of minimum update number of JNL-B is "40", and there is no journal record whose update number 303 is smaller than "40" in JNL-C. Therefore, all the journal records of JNL-C are not reflected on COPY1 and discarded.

Next, the difference formation instructing module B instructs the difference formation module B for the bitmap difference formation using the difference bitmap 3201 (S3113). To be specific, of the data included in the logical volume data1, the data corresponding to the bit of the difference bitmap 3201 having a value of "1" is transferred to the logical volume COPY1, and COPY1 is updated. The same step as the step S2706 of FIG. 27 is used for the above processing.

In the example of FIG. 32, COPY1 on which the step S3113 has been executed is in the same state as when the restore processing is executed by the journal records whose update numbers 303 are "40" to "89" (that have been already erased).

Next, the difference formation instructing module B instructs the difference formation module B to transfer the journal record stored in JNL-B to JNL-C (S3114).

In the example of FIG. 32, the journal records whose update numbers 303 are "90" to "150" (in other words, all the journal records stored in JNL-B) are transferred to and stored in JNL-C. After that, similarly to the restore processing of the step S3112, the data included in those journal records are reflected on the logical volume COPY 1.

The journal BM difference formation ends after the above-mentioned steps (S3109). After that, the storage systems B and C are operated as the pair by the asynchronous remote copy. When abnormality occurs in any of the steps S3101 to S3114, the journal BM difference formation is unsuccessful. In this case, similarly to the step S3115, all the data of the logical volume data1 are copied, thereby forming the pair between the storage systems B and C.

According to the above-mentioned journal BM difference formation, immediately after the state of the pair of the storage systems B and C is set to suspend, the operation of the host computer can be started, which reduces the time during which the system stops.

Further, according to the journal BM difference formation, only the updated data is copied to form the pair between the storage systems B and C, so the time required for forming the pair can be reduced.

Furthermore, when predetermined conditions are satisfied, the journal BM difference formation can be executed even in the case where the journal difference formation cannot be executed due to the shortage of the journal record.

What is claimed is:

1. A computer system, comprising:
a first storage system that is coupled to a first host computer;
a second storage system that is coupled to a second host computer and the first storage system; and
a third storage system that is coupled to the first storage system and the second storage system, wherein:
the first storage systems:
stores data sent from the first host computer,
transfers the data sent from the first host computer to the second storage system by synchronous remote copy, and
transfers the data sent from the first host computer to the third storage system by asynchronous remote copy; and
the second storage system:
comprises a first difference bitmap,
updates a bit of the first difference bitmap corresponding to an area to which the data has been written from the second host computer after data is written from the second host computer to the second storage system,
transfers the data stored in the area corresponding to the updated bit of the first difference bitmap to the third storage system,
instructs the third storage system to delete a pair relationship between the third storage system and the first storage system in response to detecting a failure of the first storage system,
monitors a journal transfer between the first storage system and the third storage system to determine that the pair relationship between the first storage system and the third storage system is deleted,
creates a third difference bitmap used in connection with asynchronous transfers from the second storage system to the third storage system when it is determined that the pair relationship between the first storage system and the third storage system is deleted,
copies bit values of the first difference bitmap to the third difference bitmap, and
transfers data from the second storage system to the third storage system based upon the bit values of the third difference bitmap.

2. The computer system according to claim 1,
wherein before the second storage system transfers the data stored in the area corresponding to the updated bit of the first difference bitmap to the third storage system,
the first storage system stops writing data sent from the first host computer,
the second storage system stops transferring data between the first storage system and the second storage system by the synchronous remote copy, and
the first storage system and the third storage system completes transferring data therebetween by the asynchronous remote copy.

3. The computer system according to claim 2,
wherein before stopping transferring the data between the first storage system and the second storage system by the synchronous remote copy, the first storage system stops writing the data sent from the first host computer.

4. The computer system according to claim 1, wherein:
the first storage system comprises a second difference bitmap;
the second storage system stops transferring data between the first storage system and the second storage system by the synchronous remote copy;
the first storage system updates a bit of the second difference bitmap corresponding to an area to which the data has been written from the first host computer after the second storage system stops transferring data between the first storage system and the second storage system by the synchronous remote copy;
the first storage system and the third storage system complete transferring data therebetween by the asynchronous remote copy; and
the second storage system transfers to the third storage system the data stored in the area corresponding to the updated bit of the second difference bitmap.

5. A control method for a computer system,
the computer system comprising:
a first storage system that is coupled to a first host computer;
a second storage system that is coupled to a second host computer and the first storage system, and comprises a first difference bitmap; and
a third storage system that is coupled to the first storage system and the second storage system, the control method comprising the steps of:
transferring data written from the first host computer to the second storage system by synchronous remote copy;
further transferring the data written from the first host computer to the third storage system by asynchronous remote copy;
writing data sent from the second host computer to the second storage system;
updating a bit of the first difference bitmap corresponding to an area to which the data has been written from the second host computer;
transferring the data stored in the area corresponding to the updated bit of the first difference bitmap from the second storage system to the third storage system:
detecting a failure of the first storage system;
instructing the third storage system to delete a pair relationship between the third storage system and the first storage system when the failure of the first storage system is detected,
monitoring a journal transfer between the first storage system and the third storage system to determine that the pair relationship between the first storage system and the third storage system is deleted,
creating a third difference bitmap used in connection with asynchronous transfers from the second storage system to the third storage system when it is determined that the pair relationship between the first storage system and the third storage system is deleted,
copying bit values of the first difference bitmap to the third difference bitmap, and
transferring data from the second storage system to the third storage system based upon the bit values of the third difference bitmap.

6. The control method for a computer system according to claim 5, further comprising the steps of:
stopping writing data sent from the first host computer to the first storage system;
stopping transferring data between the first storage system and the second storage system by the synchronous remote copy; and
completing transferring data between the first storage system and the third storage system by the asynchronous remote copy,
wherein the steps stated above are executed before the step of transferring the data stored in the area corresponding to the updated bit of the first difference bitmap from the second storage system to the third storage system.

7. The control method for a computer system according to claim 6, wherein the step of stopping writing of the data sent from the first host computer to the first storage system is executed before the step of stopping transferring the data between the first storage system and the second storage system by the synchronous remote copy.

8. The control method for a computer system according to claim 5, wherein the first storage system comprises a second difference bitmap, the control method further comprising the steps of:

stopping transferring data between the first storage system and the second storage system by the synchronous remote copy;

updating the bit of the second difference bitmap corresponding to an area to which the data has been written from the first host computer after stopping transferring data between the first storage system and the second storage system by the synchronous remote copy;

completing transferring data between the first storage system and the third storage system by the asynchronous remote copy; and transferring the data stored in the area corresponding to the updated bit of the second difference bitmap from the second storage system to the third storage system.

* * * * *